US012505745B2

(12) United States Patent
Kimata et al.

(10) Patent No.: US 12,505,745 B2
(45) Date of Patent: Dec. 23, 2025

(54) TRAFFIC SAFETY SUPPORT SYSTEM

(71) Applicant: HONDA MOTOR CO., LTD., Tokyo (JP)

(72) Inventors: Akihito Kimata, Saitama (JP); Shigeru Inoue, Saitama (JP); Yuji Takagi, Saitama (JP); Masaki Okumoto, Saitama (JP); Yoshitaka Mimura, Saitama (JP); Takahiro Kurehashi, Saitama (JP); Hideo Kadowaki, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 254 days.

(21) Appl. No.: 18/190,983

(22) Filed: Mar. 28, 2023

(65) Prior Publication Data

US 2023/0326345 A1 Oct. 12, 2023

(30) Foreign Application Priority Data

Mar. 31, 2022 (JP) ................................ 2022-061242

(51) Int. Cl.
*G08G 1/00* (2006.01)
*G08G 1/16* (2006.01)

(52) U.S. Cl.
CPC ............. *G08G 1/164* (2013.01); *G08G 1/166* (2013.01)

(58) Field of Classification Search
CPC .. G08G 1/164; G08G 1/166; G08G 1/096741; G08G 1/096775; G08G 1/00
(Continued)

(56) References Cited

U.S. PATENT DOCUMENTS

2004/0193347 A1 9/2004 Harumoto et al.
2012/0161951 A1 6/2012 Ito et al.
(Continued)

FOREIGN PATENT DOCUMENTS

CN 110431613 A 11/2019
CN 111196213 A 5/2020
(Continued)

OTHER PUBLICATIONS

Notification of Reasons for Refusal issued in the JP Patent Application No. 2022-061242, mailed on Dec. 5, 2023.
(Continued)

*Primary Examiner* — Shardul D Patel
(74) *Attorney, Agent, or Firm* — CKC & Partners Co., LLC

(57) ABSTRACT

A traffic safety support system 1 includes mobile terminals that move with traffic participants in a target traffic area, and a coordination support device 6 capable of communicating with the mobile terminals. Each of the mobile terminals includes a notification device configured to make a risk notification in a hinting notification mode or in an analogue notification mode. The coordination support device includes a target area recognizer 60 configured to recognize recognition targets including the traffic participants and traffic environments and acquire recognition information, a predictor 62 configured to predict a risk in future of prediction targets that are a plurality of traffic participants in a monitoring area that is part of the target traffic area, and a risk notification specifier 64 configured to set an operation manner of risk notification for each of support targets on the basis of the recognition information and a prediction result.

12 Claims, 7 Drawing Sheets

(58) Field of Classification Search
USPC .......................................................... 701/301
See application file for complete search history.

(56) References Cited

U.S. PATENT DOCUMENTS

| | | | | |
|---|---|---|---|---|
| 2019/0337533 | A1 | 11/2019 | Kume et al. | |
| 2020/0100028 | A1 | 3/2020 | Hashimoto et al. | |
| 2020/0160714 | A1 | 5/2020 | Inaba et al. | |
| 2020/0207341 | A1 | 7/2020 | Inoue et al. | |
| 2021/0035451 | A1* | 2/2021 | Bang ...................... | B60Q 1/525 |
| 2021/0041260 | A1 | 2/2021 | Tokuchi | |
| 2021/0261139 | A1 | 8/2021 | Senmyo | |
| 2021/0375139 | A1 | 12/2021 | Nakayamada | |
| 2022/0238019 | A1 | 7/2022 | Tsuda | |
| 2024/0112581 | A1* | 4/2024 | Hirano ................... | G08G 1/166 |

FOREIGN PATENT DOCUMENTS

| | | | |
|---|---|---|---|
| CN | 111497834 | A | 8/2020 |
| CN | 113393664 | A | 9/2021 |
| CN | 114041176 | A | 2/2022 |
| JP | 2005056372 | A | 3/2005 |
| JP | 2017068589 | A | 4/2017 |
| JP | 2021025906 | A | 2/2021 |
| JP | 2021136001 | A | 9/2021 |
| JP | 2021144539 | A | 9/2021 |
| JP | 2021197009 | A | 12/2021 |
| JP | 2022015191 | A * | 1/2022 |
| WO | 2020026461 | A1 | 2/2020 |

OTHER PUBLICATIONS

Office Action issued Nov. 12, 2025 in the CN Patent Application No. 202310310910.9.

* cited by examiner

EXECUTE RISK NOTIFICATION EARLIER TO SETTING TARGET WITH HIGHER PRIORITY
→IN A CASE WHERE ACTION FOR AVOIDING RISK IS NOT PERFORMED, EXECUTE RISK NOTIFICATION TO SETTING TARGET WITH LOWER PRIORITY
→IF ACTION FOR AVOIDING RISK IS PERFORMED, CONTACT RISK DOES NOT RISE

TRAFFIC SAFETY SUPPORT SYSTEM

This application is based on and claims the benefit of priority from Japanese Patent Application No. 2022-061242, filed on 31 Mar. 2022, the content of which is incorporated herein by reference.

BACKGROUND OF THE INVENTION

Field of the Invention

The present invention relates to a traffic safety support system. More specifically, the present invention relates to a traffic safety support system that supports safe movement of traffic participants as persons or mobile bodies.

Related Art

In public traffic, various traffic participants, such as mobile bodies including four-wheeled automobiles, motorcycles, bicycles, etc. as well as pedestrians, move at different speeds in accordance with their individual intentions. As a technique for improving safety, convenience, and the like of traffic participants in such public traffic, for example, Japanese Unexamined Patent Application, Publication No. 2021-136001 discloses a driving support device that assists a driver in safely driving a vehicle.

The driving support device disclosed in Patent Document 1 includes a danger predictor configured to predict a level of danger of a vehicle on the basis of information regarding a traveling state and a surrounding environment of the vehicle, and an alarm controller configured to perform alarm operation with respect to a driver through sound, text display, and the like, on the basis of a result of evaluation of the predicted level of danger. According to the driving support device disclosed in Japanese Unexamined Patent Application, Publication No. 2021-136001, in a case where some kind of danger is predicted, the driver can be prompted to perform driving operation for avoiding the predicted danger, thereby making it possible to assist the driver in safe driving.

Patent Document 1: Japanese Unexamined Patent Application, Publication No. 2021-136001

SUMMARY OF THE INVENTION

However, in the invention disclosed in Japanese Unexamined Patent Application, Publication No. 2021-136001, a level of danger is predicted on the basis of information regarding a surrounding environment acquired by an on-board sensor such as a camera and a radar mounted on the own vehicle, and accordingly, a potential risk existing outside a detection range of the on-board sensor cannot be grasped. Thus, according to the invention disclosed in Japanese Unexamined Patent Application, Publication No. 2021-136001, the alarm is issued after a potential risk existing outside the detection range of the on-board sensor becomes apparent, and thus, there is little time to spare for the driver to perform driving operation for avoiding the risk, which may result in degrading smoothness of traffic.

The present invention is directed to providing a traffic safety support system capable of improving safety, convenience and smoothness of traffic for a plurality of traffic participants in a target traffic area.

(1) A traffic safety support system according to one aspect of the present invention includes mobile terminals that move with traffic participants as persons or mobile bodies in a target traffic area, and a coordination support device capable of communicating with the mobile terminals, and is for supporting safe movement of support targets that are traffic participants having the mobile terminals. Each of the mobile terminals includes a notification device configured to provide, to a person who moves with the mobile terminal, a risk notification in a plurality of notification modes. The coordination support device includes a recognizer configured to recognize recognition targets including the traffic participants in the target traffic area and traffic environments of the traffic participants, and acquire recognition information regarding the recognition targets, a predictor configured to predict a risk in future of prediction targets that are a plurality of traffic participants present in a monitoring area that is part of the target traffic area by performing simulation on the basis of the recognition information, a risk notification specifier configured to set an operation manner of the risk notification for each of the support targets on the basis of the recognition information and a prediction result from the predictor, and a transmitter configured to transmit a setting result from the risk notification specifier to each of the support targets.

(2) In this case, in a case where the predictor predicts occurrence of a contact risk of parties that are a plurality of support targets in the monitoring area, the risk notification specifier preferably sets priority to a plurality of prediction parties involved in the contact risk on the basis of content of the contact risk and sets ON of the risk notification earlier to prediction parties for which the priority is set higher than prediction parties for which the priority is set lower.

(3) In this case, the risk notification specifier preferably specifies a risk inducer that induces the contact risk among the plurality of prediction parties involved in the contact risk and sets the priority higher to the risk inducer than the priority set to other prediction parties except the risk inducer.

(4) In this case, in a case where the predictor predicts occurrence of a contact risk of parties that are a plurality of support targets in the monitoring area, the risk notification specifier preferably sets a first mode as the notification mode for the prediction parties determined so as to avoid occurrence of the contact risk from among the plurality of prediction parties involved in the contact risk until the contact risk becomes apparent, and sets a second mode with a higher notification intensity than the first mode as the notification mode for all the prediction parties involved in the contact risk after the contact risk becomes apparent.

(5) In this case, the risk notification specifier preferably acquires a contact prediction period that is a period required until the contact risk will occur on the basis of the prediction result from the predictor, and in a case where the contact prediction period becomes less than an apparent threshold, determines that the contact risk becomes apparent.

(6) In this case, in a case where the second mode is set as the notification mode, the notification device preferably sets the notification intensity higher as the contact prediction period becomes shorter.

(7) In this case, in a case where the first mode is set as the notification mode, the notification device preferably emits sound having directionality toward a location where the contact risk is to occur or positions of the prediction parties involved in the contact risk.

(8) In this case, the notification device is capable of executing soundness-promoting notification for bringing, into a sound state, driving capability of a driver of a mobile body that moves with the notification device, and the coordination support device preferably further includes a soundness-promoting notification specifier configured to estimate soundness of the driver for each of setting targets except parties of the contact risk predicted to occur by the predictor from among the plurality of support targets within the target traffic area on the basis of the recognition information and sets ON/OFF of the soundness-promoting notification for each of the setting targets on the basis of an estimation result.

(9) In this case, the coordination support device preferably further includes a driving subject information acquirer configured to acquire state information correlated with driving capability of a driving subject of a mobile body recognized as a traffic participant by the recognizer, and the predictor preferably predicts a risk in future of the prediction targets by constructing a virtual space that simulates the monitoring area using a computer and performing simulation on the basis of the recognition information and the state information regarding the virtual space.

(10) In this case, the predictor preferably includes a behavior estimator configured to associate a first input including at least the recognition information from the recognition information and the state information, with at least one of a plurality of pattern behaviors of the driving subject determined in advance, and a simulator configured to predict futures of the prediction targets by performing simulation based on the pattern behavior associated by the behavior estimator on the virtual space.

(11) In this case, the behavior estimator preferably includes a driving capability estimator configured to estimate decrease of the driving capability for each capability element on the basis of the first input, and an associator configured to associate the capability element for which the driving capability is estimated to have decreased by the driving capability estimator with at least one of a plurality of the pattern behaviors.

(12) In this case, the driving capability is preferably divided into at least four capability elements of cognitive capability, prediction capability, determination capability and operation capability of the driving subject.

(1) The traffic safety support system according to the present invention includes the mobile terminals that move with the traffic participants in the target traffic area and the coordination support device capable of communicating with the mobile terminals. Further, in the present invention, it is possible to predict existence of a potential risk for each of the traffic participants by the coordination support device acquiring the recognition information regarding the recognition targets including the traffic participants in the target traffic area and traffic environments of the traffic participants and further predicting a risk in future of the prediction targets in the monitoring area by simulation based on the recognition information. Further, in the present invention, the risk notification can be made to each of the support targets before a risk potentially existing for each of the support targets becomes apparent by setting the operation manner of the risk notification for each of the support targets on the basis of the prediction result from the predictor and further, transmitting a setting result to each of the support targets, and thus, each of the support targets can perform action for avoiding the risk with time to spare, so that it is possible to improve safety, convenience and smoothness of traffic by the plurality of traffic participants in the target traffic area. Further, in the present embodiment, the operation manner of the risk notification can be optimized for each of the support targets by the risk notification specifier setting the operation manner of the risk notification for each of the support targets, and thus, it is possible to prevent disorder of a traffic stream due to excessive risk notifications being made to support targets in a state or an environment where risk notification is not required, so that it is possible to improve convenience and smoothness as well as safety of traffic.

(2) In a case where the predictor predicts occurrence of a contact risk of parties that are a plurality of support targets in the monitoring area, the risk notification specifier sets priority to the plurality of prediction parties involved in the contact risk on the basis of content of the contact risk and sets ON of the risk notification earlier to prediction parties for which the priority is set higher than prediction parties for which the priority is set lower. By this means, for example, by setting the priority higher to prediction parties that are effective for preventing occurrence of the contact risk among the plurality of prediction parties that can be involved in the same contact risk and making the risk notification earlier, it is possible to prevent the contact risk from becoming apparent or occurring before the risk notification is made to prediction parties with the lower priority thereafter. Thus, according to the present invention, targets to which the risk notifications are to be made can be minimized, so that it is possible to prevent disorder of a traffic stream due to excessive risk notifications, which results in improving convenience and smoothness as well as safety of traffic.

(3) The risk notification specifier specifies a risk inducer that induces the contact risk among the plurality of prediction parties involved in the contact risk and sets the priority higher to the risk inducer than priority set to other prediction parties except the risk inducer and makes the risk notification to the risk inducer earlier. By this means, action that induces the contact risk by the risk inducer can be prevented, so that it is possible to prevent the contact risk from becoming apparent or occurring before the risk notifications are made to other prediction parties with lower priority. Thus, according to the present invention, targets to which the risk notifications are to be made can be minimized, so that it is possible to prevent disorder of a traffic stream due to excessive risk notifications, which results in improving convenience and smoothness as well as safety of traffic.

(4) In a case where the predictor predicts occurrence of the contact risk of parties that are a plurality of support targets in the monitoring area, the risk notification specifier sets a first mode as a notification mode for the prediction parties determined so as to avoid occurrence of the contact risk from among the plurality of prediction parties involved in the contact risk until the contact risk becomes apparent. By this means, it is possible to prevent the predicted contact risk from becoming apparent. Further, the risk notification specifier sets a second mode with a higher notification intensity than the first mode as a notification mode set to all the prediction parties involved in the contact risk after the predicted contact risk becomes apparent. By this means, even in a case where the contact risk cannot be prevented from becoming apparent only with the risk notification under the first mode, by making the risk notifications to all the prediction parties under the second mode with the higher notification intensity than the first mode, it is possible to prevent the contact risk from occurring. Thus, according to the present invention, it is possible to improve safety, convenience and smoothness of traffic.

(5) The risk notification specifier acquires a contact prediction period that is a period until the contact risk will occur on the basis of the recognition information and in a case where the contact prediction period becomes less than an apparent threshold, determines that the contact risk becomes apparent. As a result of it being determined that the contact risk becomes apparent at such a timing and the risk notifications being made to all the prediction parties under the second mode, each prediction party can perform action for avoiding the contact risk with time to spare. Thus, according to the present invention, it is possible to improve safety, convenience and smoothness of traffic.

(6) In a case where the second mode is set as the notification mode, the notification device sets a notification intensity higher as the contact prediction period becomes shorter. This allows a person (for example, a pedestrian or a driver of the mobile body) who moves with the notification device to recognize existence of a contact risk that comes near and perform action for avoiding the contact risk. Thus, according to the present invention, it is possible to improve safety, convenience and smoothness of traffic.

(7) In a case where the first mode is set as the notification mode, the notification device emits sound having directionality toward a location where the contact risk is to occur or positions of the prediction parties involved in the contact risk. This makes it possible to direct attention of a person (for example, a driver of the mobile body) who moves with the notification device to a potential risk in such a manner as not to annoy the driver.

(8) The notification device can execute soundness-promoting notification for bringing, into a sound state, driving capability of the driver of the mobile body that moves with the notification device, and the coordination support device further includes a soundness-promoting notification specifier configured to estimate soundness of the driver on the basis of the recognition information for each of setting targets except parties of the contact risk predicted by the predictor from among the plurality of support targets in the target traffic area and further set ON/OFF of soundness-promoting notification for each of the setting targets on the basis of an estimation result. This makes it possible to bring drivers of mobile bodies that move in the target traffic area into a sound state, so that it is possible to improve safety, convenience and smoothness of traffic in the target traffic area.

(9) The predictor predicts future of the prediction targets by constructing a virtual space that simulates the monitoring area using a computer and performing simulation on the basis of the recognition information and the state information regarding the virtual space. By this means, the predictor can predict various risks that can occur in the prediction targets by reproducing traffic participants in the monitoring traffic area and traffic environments around the traffic participants and monitoring an event that can occur in the monitoring traffic area from a higher perspective. Thus, according to the present invention, it is possible to further improve safety, convenience and smoothness of traffic.

(10) The behavior estimator associates the first input including at least the recognition information from the recognition information and the state information with at least one of a plurality of pattern behaviors of the driving subject determined in advance, and the simulator predicts future of the prediction targets by performing simulation on the basis of the pattern behavior associated by the behavior estimator on the virtual space. In the present invention, the predictor can predict futures of the prediction targets promptly by behaviors that can be performed by the driving subject of the mobile body in the future being determined in advance as the pattern behaviors, so that it is possible to promptly make notifications of support information based on the prediction result from the predictor, which results in securing a period for each traffic participant to perform action for avoiding a risk that can occur in the future. Thus, according to the present invention, it is possible to further improve safety, convenience and smoothness of traffic.

(11) The behavior estimator includes a driving capability estimator configured to estimate decrease of driving capability of the driving subject on the basis of the first input including at least the recognition information for each capability element, and an associator configured to associate the driving capability element for which the driving capability is estimated to have decreased by the driving capability estimator with at least one of the plurality of pattern behaviors determined in advance. This allows the associator to promptly determine the pattern behavior from the first input, so that it is possible to further secure a period for each traffic participant to perform action for avoiding a risk that can occur in the future as described above. Thus, according to the present invention, it is possible to further improve safety, convenience and smoothness of traffic.

(12) The driving capability estimator divides driving capability that the driving subject should have to appropriately drive the mobile body into at least four capability elements of cognitive capability, prediction capability, determination capability and operation capability and estimates decrease of the driving capability of the driving subject for each of the four capability elements. This allows the behavior estimator to promptly determine an appropriate pattern behavior in accordance with decrease of each capability element, so that it is possible to further secure a period for each traffic participant to perform action for avoiding a risk that can occur in the future as described above. Thus, according to the present invention, it is possible to further improve safety, convenience and smoothness of traffic.

DETAILED DESCRIPTION OF THE INVENTION

A traffic safety support system according to one embodiment of the present invention will be described below with reference to the drawings.

Figure 1:
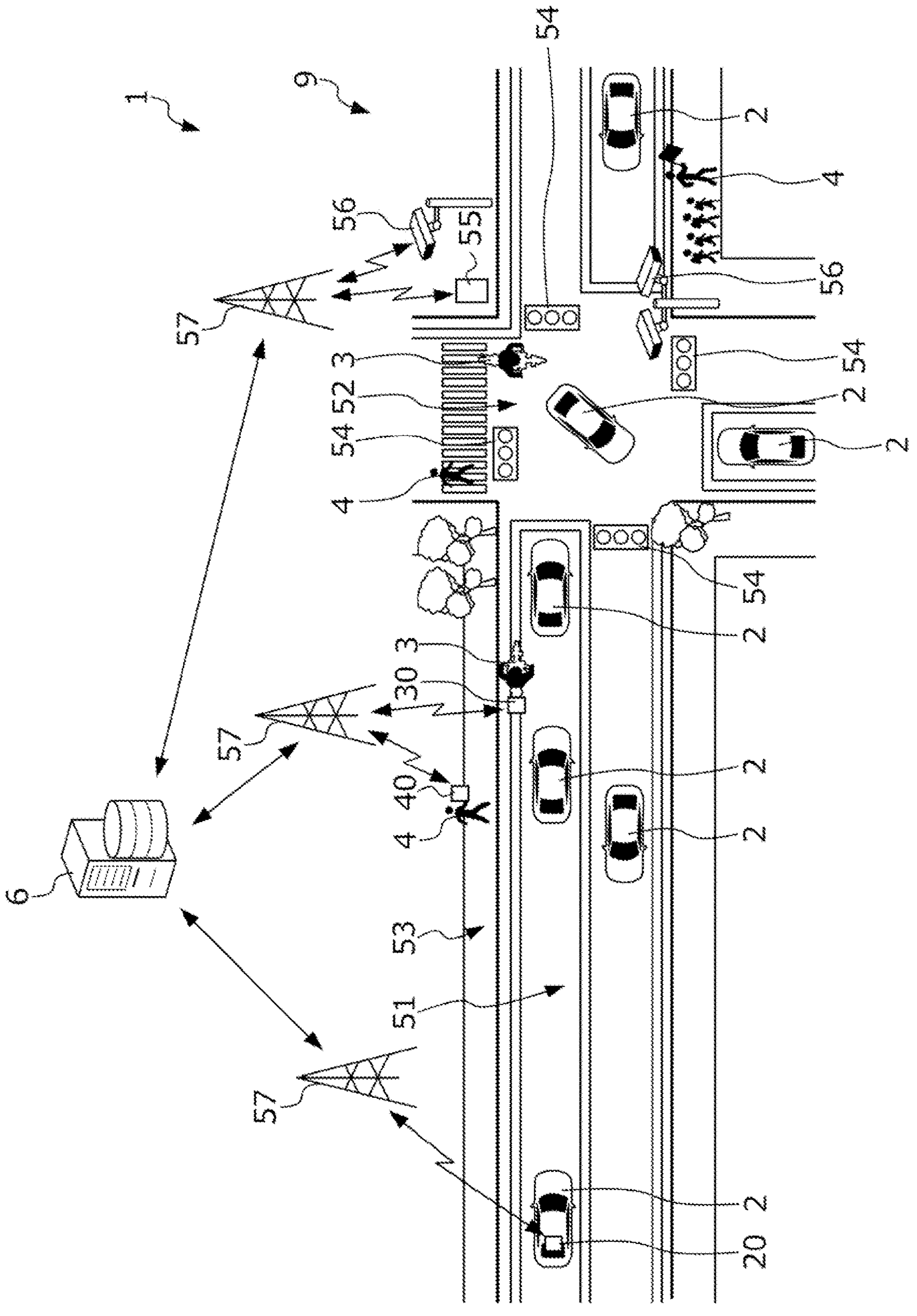
FIG. 1 is a view illustrating a configuration of a traffic safety support system according to one embodiment of the present invention and part of a target traffic area to be supported by the traffic safety support system.

FIG. 1 is a view schematically illustrating a configuration of a traffic safety support system 1 according to the present embodiment and part of a target traffic area 9 in which traffic participants to be supported by the traffic safety support system 1 are present.

The traffic safety support system 1 supports safe and smooth traffic of traffic participants in the target traffic area 9 by recognizing pedestrians 4 that are persons moving in the target traffic area 9 and four-wheeled vehicles 2, motorcycles 3, and the like, that are mobile bodies as individual traffic participants, notifying each traffic participant of support information generated through the recognition to encourage communication (specifically, for example, reciprocal recognition between the traffic participants) between the traffic participants that move on the basis of intentions of the traffic participants and recognition of a surrounding traffic environment.

FIG. 1 illustrates a case where an area around an intersection 52 in an urban area, including a road 51, the intersection 52, a pavement 53 and traffic lights 54 as traffic infrastructure equipment is set as the target traffic area 9. FIG. 1 illustrates a case where a total of seven four-wheeled vehicles 2 and a total of two motorcycles 3 move on the road 51 and at the intersection 52 and a total of three sets of pedestrians 4 move on the pavement 53 and at the intersection 52. Further, FIG. 1 illustrates a case where a total of three infrastructure cameras 56 are provided.

The traffic safety support system 1 includes on-board equipment 20 (including on-board devices mounted on the four-wheeled vehicles 2 and portable information processing terminals possessed or worn by drivers who drive the four-wheeled vehicles 2) that moves along with individual four-wheeled vehicles 2, on-board equipment 30 (including on-board devices mounted on the motorcycles 3 and portable information processing terminals possessed or worn by drivers who drive the motorcycles 3) that moves along with individual motorcycles 3, portable information processing terminals 40 possessed or worn by the respective pedestrians 4, a plurality of the infrastructure cameras 56 provided in the target traffic area 9, a traffic light control device 55 that controls the traffic lights 54, and a coordination support device 6 connected to a plurality of terminals (hereinafter, also simply referred to as "area terminals") such as these on-board equipment 20 and 30, the portable information processing terminals 40, the infrastructure cameras 56 and the traffic light control device 55 installed in the target traffic area 9 so as to be able to perform communication.

The coordination support device 6 includes one or more computers connected to the above-described plurality of area terminals via a base station 57 so as to be able to perform communication. More specifically, the coordination support device 6 includes a server connected to the plurality of area terminals via the base station 57, a network core and the Internet, an edge server connected to the plurality of area terminals via the base station 57 and an MEC (multi-access edge computing) core, and the like.

Figure 2:
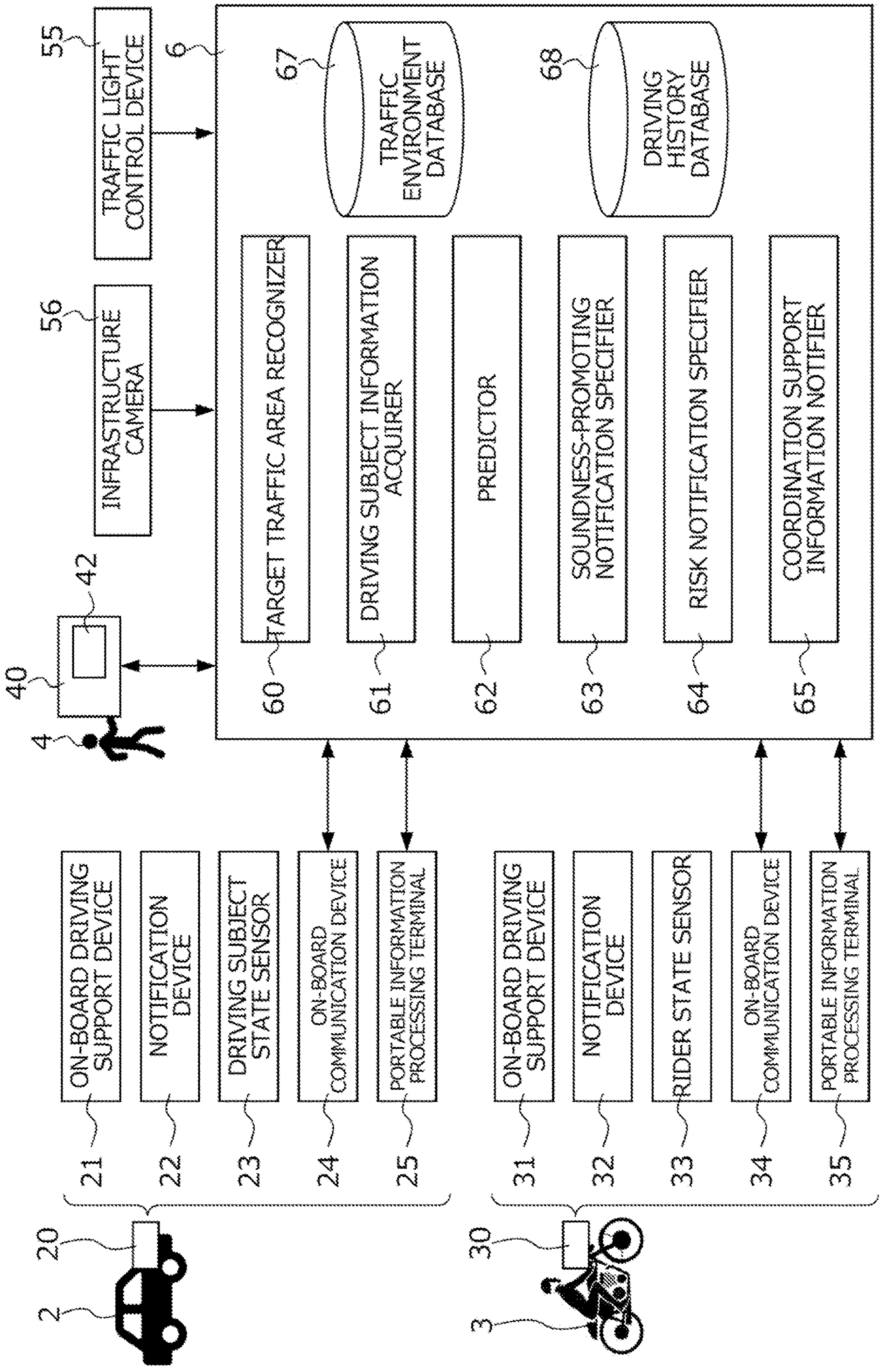
FIG. 2 is a block diagram illustrating a configuration of a coordination support device and a plurality of area terminals connected to the coordination support device so as to be able to perform communication.

FIG. 2 is a block diagram illustrating a configuration of the coordination support device 6 and a plurality of area terminals connected to the coordination support device 6 so as to be able to perform communication.

The on-board equipment 20 mounted on the four-wheeled vehicles 2 in the target traffic area 9 includes, for example, an on-board driving support device 21 that supports driving by a driver, a notification device 22 that notifies the driver of various kinds of information, a driving subject state sensor 23 that detects a state of the driver engaged in driving, an on-board communication device 24 that performs wireless communication between the own vehicle and the coordination support device 6 and other vehicles near the own vehicle, a portable information processing terminal 25 possessed or worn by the driver, and the like.

The on-board driving support device 21 includes an external sensor, an own vehicle state sensor, a navigation device, a driving support ECU, and the like. The external sensor includes an exterior camera that captures an image around the own vehicle, a plurality of on-board external sensors mounted on the own vehicle, such as a radar and a LIDAR (light detection and ranging) that detects a target outside the vehicle using an electromagnetic wave, and an outside recognition device that acquires information regarding a state around the own vehicle by performing sensor fusion processing on detection results by these on-board external sensors. The own vehicle state sensor includes a sensor that acquires information regarding a traveling state of the own vehicle, such as a vehicle speed sensor, an acceleration sensor, a steering angle sensor, a yaw rate sensor, a position sensor and an orientation sensor. The navigation device includes, for example, a GNSS receiver that specifies a current position of the own vehicle on the basis of a signal received from a GNSS (global navigation satellite system) satellite, a storage device that stores map information, and the like.

The driving support ECU executes driving support control such as lane departure prevention control, lane change control, preceding vehicle following control, erroneous start prevention control, collision mitigation brake control and collision avoidance control on the basis of the information acquired by the external sensor, the own vehicle state sensor, the navigation device, and the like. Further, the driving support ECU generates driving support information for supporting safe driving by the driver on the basis of the information acquired by the external sensor, the own vehicle state sensor, the navigation device, and the like, and transmits the driving support information to the notification device 22.

Here, the driving support ECU starts collision mitigation brake control of automatically operating a control device of the own vehicle so as to reduce damage by contact of the own vehicle and another mobile body on condition that there is a mobile body that may come into contact with the own vehicle within a predetermined collision mitigation brake actuation range around the own vehicle. Further, the driving support ECU starts collision avoidance control of automatically operating a steering device of the own vehicle to avoid contact of the own vehicle and another mobile body on condition that there is a mobile body that may come into contact with the own vehicle within a predetermined collision avoidance steering operation range around the own vehicle. In the following description, the collision mitigation brake actuation range and the collision avoidance steering operation range will be also collectively referred to as an "ADAS actuation range".

The driving subject state sensor 23 includes various devices that acquire time-series data of information correlated with driving capability of the driver engaged in driving. The driving subject state sensor 23 includes, for example, an on-board camera that detects a direction of a line of sight of the driver engaged in driving, whether or not the driver opens his/her eyes, and the like, a seat belt sensor that is provided at a seat belt to be fastened by the driver and detects a pulse of the driver, whether or not the driver breathes, and the like, a steering sensor that is provided at a steering to be gripped by the driver and detects a skin potential of the driver, and an on-board microphone that detects whether or not there is conversation between the driver and passengers.

The on-board communication device 24 has a function of transmitting the information acquired by the driving support ECU (including the information acquired by the external sensor, the own vehicle state sensor, the navigation device, and the like, control information regarding driving support control that is being executed, and the like), the information regarding the driving subject acquired by the driving subject state sensor 23, and the like, to the coordination support device 6, and a function of receiving coordination support information transmitted from the coordination support device 6 and transmitting the received coordination support information to the notification device 22.

The notification device 22 includes various devices that notify the driver of various kinds of information through auditory sense, visual sense, haptic sense, and the like, by causing a human machine interface (hereinafter, abbreviated as an "HMI") to operate in a manner determined on the basis of the driving support information transmitted from the on-board driving support device 21 and the coordination support information transmitted from the coordination support device 6.

Figure 3A:
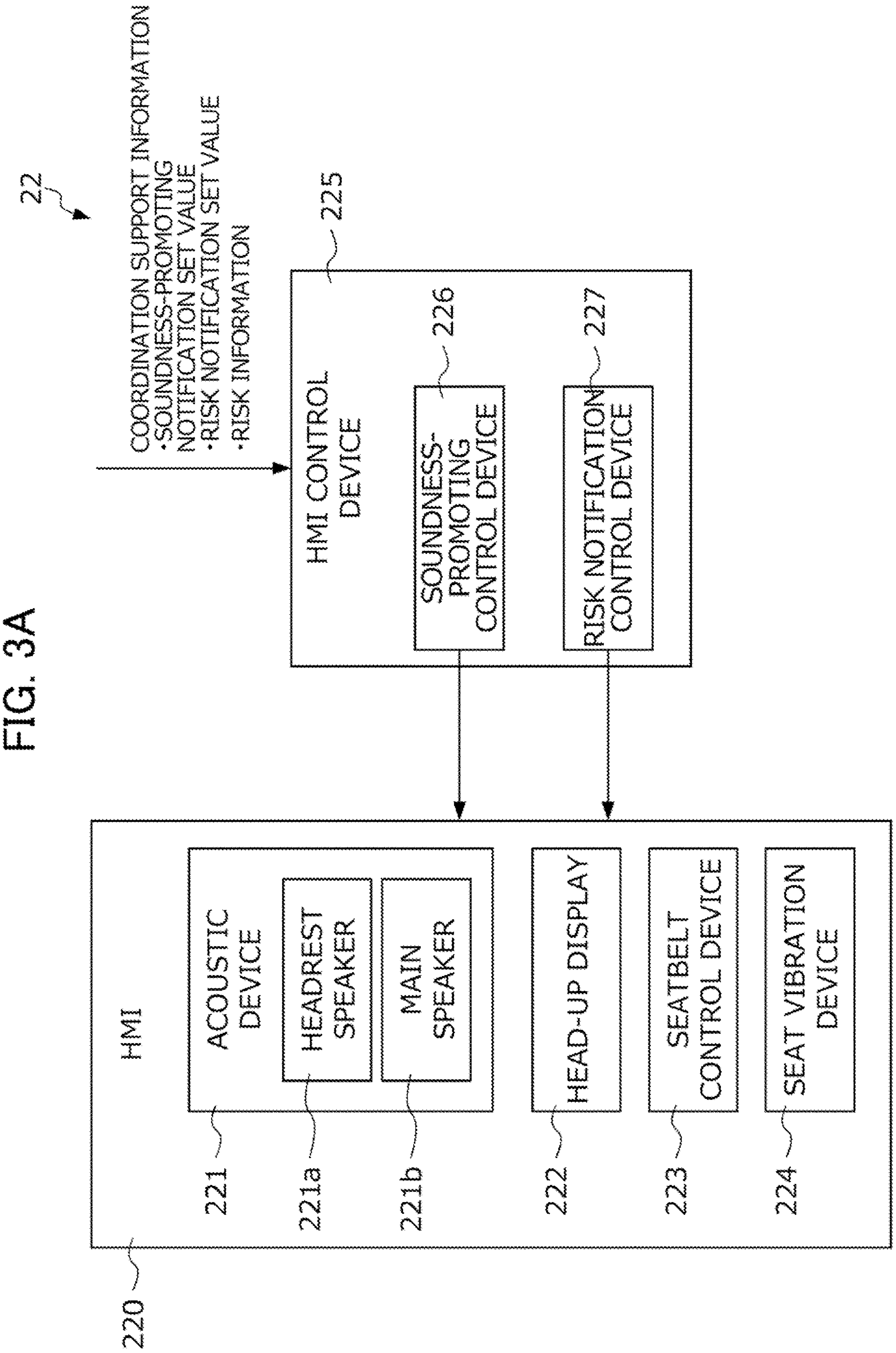
FIG. 3A is a block diagram illustrating a configuration of a notification device mounted on a four-wheeled vehicle.

FIG. 3A is a block diagram illustrating a configuration of the notification device 22 mounted on a four-wheeled vehicle. Note that FIG. 3A illustrates, within the notification device 22, only blocks particularly regarding control based on the coordination support information transmitted from the coordination support device 6.

The notification device 22 includes an HMI 220 that operates in a manner recognizable by the driver, and an HMI control device 225 that causes the HMI 220 to operate on the basis of the coordination support information transmitted from the coordination support device 6.

The HMI 220 includes an acoustic device 221 that operates in a manner auditorily recognizable by the driver, a head-up display 222 that operates in a manner visually recognizable by the driver, and a seat belt control device 223 and a seat vibration device 224 that operates in a manner haptically recognizable by the driver.

The acoustic device 221 includes a headrest speaker 221*a* that is provided at a headrest of a driver's seat to be seated by the driver and capable of emitting binaural sound having directivity, and a main speaker 221*b* that is provided in the vicinity of the driver's seat and a passenger's seat. The headrest speaker 221*a* and the main speaker 221*b* emit sound in accordance with a command from the HMI control device 225. The head-up display 222 displays an image in accordance with a command from the HMI control device 225 within a field of view (for example, a windshield) of the driver engaged in driving. The seat belt control device 223 changes tension of the seat belt to be fastened by the driver in accordance with a command from the HMI control device 225. The seat vibration device 224 vibrates the seat to be seated by the driver at an amplitude and/or a frequency in accordance with a command from the HMI control device 225.

The HMI control device 225 includes a soundness-promoting control device 226 configured to make a soundness-promoting notification for causing the HMI 220 to operate in a manner determined for bringing driving capability (particularly, cognitive capability) of the driver into a sound state, and a risk notification control device 227 configured to make a risk notification for causing the HMI 220 to operate in a manner determined for causing the driver to recognize existence of a risk that comes near. As will be described later, the coordination support information to be transmitted from the coordination support device 6 to the four-wheeled vehicle 2 includes information regarding a soundness-promoting notification set value for setting ON/OFF of soundness-promoting notification by the soundness-promoting control device 226, information regarding a risk notification set value for setting ON/OFF of the risk notification by the risk notification control device 227 or a type of a notification mode which will be described later, information (hereinafter, also referred to as "risk information") regarding a risk that comes near to the driver, and the like.

The soundness-promoting notification set value to be input to the soundness-promoting control device 226 is set at one of "0" for setting OFF of the soundness-promoting notification by the soundness-promoting control device 226 and "1" for setting ON of the soundness-promoting notification by the soundness-promoting control device 226.

In a case where the soundness-promoting notification set value is "0", the soundness-promoting control device 226 sets OFF of the soundness-promoting notification. In other words, in a case where the soundness-promoting notification set value is "0", the soundness-promoting control device 226 does not cause the HMI 220 to operate. Note that this does not inhibit operation of the HMI 220 by the risk notification control device 227.

In a case where the soundness-promoting notification set value is "1", the soundness-promoting control device 226 sets OFF of the soundness-promoting notification. More specifically, the soundness-promoting control device 226 brings driving capability of the driver into a sound state by, for example, playing music that attracts interest and attention of the driver using the headrest speaker 221*a* or the main speaker 221*b*. Note that in this event, to increase a degree of awareness of the driver, beats per minute (BPM) of the music may be changed, or a bass tone may be emphasized.

In this manner, the soundness-promoting control device 226 causes the HMI 220 to operate to bring driving capability of the driver into a sound state, and thus, in a case where the risk notification is set ON by the risk notification control device 227 which will be described later (that is, in a case where the risk notification set value is "1" or "2"), the soundness-promoting notification may be set OFF so that the driver will not be annoyed. Further, while in the present embodiment, a case will be described where the soundness-promoting control device 226 brings driving capability into a sound state mainly via auditory sense of the driver by causing the headrest speaker 221*a* or the main speaker 221*b* to operate, the present invention is not limited to this. The soundness-promoting control device 226 may, for example, cause the seat belt control device 223 or the seat vibration device 224 to operate.

The risk notification control device 227 can make a risk notification in a plurality of notification modes in which at least one of a device to be caused to operate among those of the HMI 220 or an operation manner is different. More specifically, the risk notification control device 227 can make a risk notification in at least one of a hinting notification mode intended to cause the driver to recognize existence of a potential risk, an analogue notification mode intended to cause the driver to recognize existence of a visible risk and/or a level of the risk, or a prediction-assisted notification mode intended to notify the driver of information useful for avoiding a predicted risk. Thus, as the risk notification set value to be input to the risk notification control device 227, one of "0" for setting OFF of risk notification, "1" for setting ON of risk notification in the hinting notification mode, "2" for setting ON of risk notification in the analogue notification mode, "3" for setting ON of risk notification in the prediction-assisted notification mode, "4" for setting ON of risk notification in the hinting notification mode and the prediction-assisted notification mode, and "5" for setting ON of risk notification in the analogue notification mode and the prediction-assisted notification mode is set.

In a case where the risk notification set value is "0", the risk notification control device 227 sets OFF of risk notification. In other words, in a case where the risk notification set value is "0", the risk notification control device 227 does not cause the HMI 220 to operate. Note that this does not inhibit operation of the HMI 220 by the soundness-promoting control device 226.

In a case where the risk notification set value is "1", the risk notification control device 227 sets the hinting notification mode as the notification mode and turns ON risk notification in the set notification mode.

In a case where the risk notification set value is "2", the risk notification control device 227 sets the analogue notification mode as the notification mode and turns ON risk notification in the set notification mode.

In a case where the risk notification set value is "3", the risk notification control device 227 sets the prediction-assisted notification mode as the notification mode and turns ON risk notification in the set notification mode.

In a case where the risk notification set value is "4", the risk notification control device 227 sets the hinting notification mode and the prediction-assisted notification mode as the notification modes and turns ON risk notification in these set notification modes.

Further, in a case where the risk notification set value is "5", the risk notification control device 227 sets the analogue notification mode and the prediction-assisted notification mode as the notification modes and turns ON risk notification in the set notification modes.

Here, in a case where the prediction-assisted notification mode is set as the notification mode, the risk notification control device 227 generates risk avoidance support information useful for avoiding a risk that comes near to the driver on the basis of the risk information transmitted from the coordination support device 6 and causes the acoustic device 221 and the head-up display 222 of the HMI 220 to operate in such a manner that enables the driver to auditorily and visually recognize the risk avoidance support information. Here, the risk avoidance support information includes information regarding a position of a traffic participant which may come into contact with the own vehicle (hereinafter, also referred to as a "risk-carrying subject"), information regarding a point at which the own vehicle may come into contact with the risk-carrying subject (hereinafter, also referred to as a "risk occurrence point"), and information including content that evokes attention of the driver to the risk-carrying subject.

More specifically, in a case where there is a motorcycle driven by an unsound rider ahead of the four-wheeled vehicle driven by the driver, the risk notification control device 227 emits a message having content of "Be careful of dangerous right-turn of the motorcycle" by the acoustic device 221 or displays the message on the head-up display 222 as the risk avoidance support information for avoiding contact with the motorcycle. Further, in this event, the risk notification control device 227 may display an image of an arrow indicating a current position or a predicted position of the motorcycle on the head-up display 222 as the risk avoidance support information for avoiding contact with the motorcycle.

Still further, in a case where the hinting notification mode is set as the notification mode, the risk notification control device 227 causes the driver to spontaneously recognize presence of a risk-carrying subject extracted from the risk information transmitted from the coordination support device 6 by causing the HMI 220 to operate in such a manner as not to annoy the driver. In such a hinting notification mode, in order to cause the driver to spontaneously recognize presence of a risk-carrying subject without annoying the driver, the risk notification control device 227 preferably causes the headrest speaker 221*a* that particularly appeals to auditory sense of the driver among the plurality of devices included in the HMI 220. More specifically, in a case where the hinting notification mode is set as the notification mode, the risk notification control device 227 spontaneously brings the line of sight of the driver to a position of the risk-carrying subject or a risk occurrence point by causing the headrest speaker 221*a* to emit a familiar sound effect with binaural sound having directivity directed to the position of the risk-carrying subject or the risk occurrence point at small volume.

Further, in a case where the analogue notification mode is set as the notification mode, the risk notification control device 227 causes the driver to strongly recognize presence of the risk-carrying subject extracted from the risk information transmitted from the coordination support device 6 and a level of the risk by the risk-carrying subject by causing the HMI 220 to operate in a manner different from the hinting notification mode described above. In this manner, in the analogue notification mode, to cause the driver to strongly recognize presence of the risk-carrying subject, the risk notification control device 227 causes the HMI 220 to operate in a manner with higher notification intensity than notification intensity of the manner set in the hinting notification mode. Here, the notification intensity refers to strength of attracting concern and attention of the driver. More specifically, in a case where the analogue notification mode is set as the notification mode, the risk notification control device 227 causes the headrest speaker 221*a* and the main speaker 221*b* to emit buzzer sound or pulse sound at larger volume than the volume of the sound effect emitted in the hinting notification mode. The buzzer sound and the pulse sound are unfamiliar high-volume sound for the driver compared to the sound effect emitted in the hinting notification mode, and thus, the notification intensity is higher than the notification intensity of the sound effect emitted in the hinting notification mode.

Note that while in the present embodiment, a case will be described where the risk notification control device 227 causes the acoustic device 221 to operate in a case where the analogue notification mode is set as the notification mode, the present invention is not limited to this. In a case where the analogue notification mode is set as the notification mode, the risk notification control device 227 may cause the seat belt control device 223 to operate to change tension of the seat belt or cause the seat vibration device 224 to operate to vibrate the seat instead of causing the acoustic device 221 to operate. In this manner, the seat belt control device 223 and the seat vibration device 224 operate in a manner that appeals to haptic sense of the driver, and thus, the notification intensity is higher than the notification intensity of the sound effect emitted in the hinting notification mode. Further, in a case where the analogue notification mode is set as the notification mode, the risk notification control device 227 may cause the acoustic device 221, the seat belt control device 223 and the seat vibration device 224 to operate in combination.

Further, as described above, in the analogue notification mode, to cause the driver to strongly recognize a level of the risk by the risk-carrying subject in addition to presence of the risk-carrying subject, the risk notification control device 227 preferably changes the notification intensity in accordance with the level of the risk by the risk-carrying subject (e.g., the length of a predicted period until a possible collision with the risk-carrying subject) extracted from the risk information transmitted from the coordination support device 6. Specifically, the risk notification control device 227 may increase the notification intensity by increasing a volume of the buzzer sound, increasing a volume of the pulse sound or shortening an interval of the pulse sound as the level of the risk becomes higher (i.e., as the predicted period until the possible collision with the risk-carrying subject shortens). In a case where the seat belt control device 223 is caused to operate as described above, the risk notification control device 227 may increase the notification intensity by increasing tension of the seat belt as the level of the risk becomes higher. Further, in a case where the seat vibration device 224 is caused to operate as described above, the risk notification control device 227 may increase the notification intensity by increasing an amplitude of vibration of the seat as the level of the risk becomes higher.

Further, in a case where the notification intensity is changed in accordance with the level of the risk in this manner, the risk notification control device 227 preferably causes the HMI 220 to operate so that the notification intensity becomes maximum at a time point at which execution of the collision mitigation brake control and the collision avoidance steering control is started by the driving support ECU described above, in other words, at a time point at which the risk-carrying subject enters the ADAS actuation range of the own vehicle.

Returning to FIG. 2, the portable information processing terminal 25 includes, for example, a wearable terminal to be worn by the driver of the four-wheeled vehicle 2, a smartphone possessed by the driver, and the like. The wearable terminal has a function of measuring biological information of the driver such as a heart rate, a blood pressure and a blood oxygen level and transmitting the measurement data of the biological information to the coordination support device 6 and a function of receiving the coordination support information transmitted from the coordination support device 6 and notifying the driver of a message in accordance with the coordination support information with an image, speech, warning sound, vibration, and the like. Further, the smartphone has a function of transmitting information regarding the driver such as position information, travel acceleration and schedule information of the driver to the coordination support device 6 and a function of receiving the coordination support information transmitted from the coordination support device 6 and notifying the driver of a message in accordance with the coordination support information with an image, speech, warning sound, melody, vibration, and the like.

The on-board equipment 30 mounted on the motorcycles 3 in the target traffic area 9 includes, for example, an on-board driving support device 31 that supports driving by a rider, a notification device 32 that notifies the rider of various kinds of information, a rider state sensor 33 that detects a state of the rider engaged in driving, an on-board communication device 34 that performs wireless communication between the own vehicle, and the coordination support device 6 and other vehicles near the own vehicle, a portable information processing terminal 35 possessed or worn by the rider, and the like.

The on-board driving support device 31 includes an external sensor, an own vehicle state sensor, a navigation device, a driving support ECU, and the like. The external sensor includes an exterior camera that captures an image around the own vehicle, a plurality of on-board external sensors mounted on the own vehicle such as a radar and a LIDAR that detects a target outside the vehicle by using an electromagnetic wave, and an outside recognition device that acquires information regarding a state around the own vehicle by performing fusion processing on detection results by the on-board exterior sensors. The own vehicle state sensor includes sensors that acquire information regarding a traveling state of the own vehicle such as a vehicle speed sensor and a five-axis or six-axis inertial measurement device. The navigation device includes, for example, a GNSS receiver that specifies a current position on the basis of a signal received from a GNSS satellite, a storage device that stores map information, and the like.

The driving support ECU executes driving support control such as lane keeping control, lane departure prevention control, lane change control, preceding vehicle following control, erroneous start prevention control and collision mitigation brake control on the basis of the information acquired by the external sensor, the own vehicle state sensor, the navigation device, and the like. Further, the driving support ECU generates driving support information for supporting safe driving by the rider on the basis of the information acquired by the external sensor, the own vehicle state sensor, the navigation device, and the like, and transmits the driving support information to the notification device 32.

Here, the driving support ECU starts collision mitigation brake control of automatically operating a brake device of the own vehicle to reduce damage by contact of the own vehicle and another mobile body on condition that there is a mobile body that may come into contact with the own vehicle within a predetermined collision mitigation brake actuation range (hereinafter, also referred to as an "ADAS actuation range" which is also used for a term defined for the four-wheeled vehicle 2) present near the own vehicle.

The rider state sensor 33 includes various devices that acquire information correlated with driving capability of the rider engaged in driving. The rider state sensor 33 includes, for example, a seat sensor that is provided at a seat to be seated by the rider and detects a pulse, whether or not the rider breathes, and the like, a helmet sensor that is provided at a helmet to be worn by the rider and detects a pulse of the rider, whether or not the rider breathes, a skin potential, and the like.

The on-board communication device 34 has a function of transmitting the information acquired by the driving support ECU (including the information acquired by the external sensor, the own vehicle state sensor, the navigation device, and the like, and control information regarding driving support control that is being executed), information regarding the rider acquired by the rider state sensor 33, and the like, to the coordination support device 6 and a function of receiving the coordination support information transmitted from the coordination support device 6 and transmitting the received coordination support information to the notification device 32.

The notification device 32 includes various devices that notifies the rider of various kinds of information through auditory sense, visual sense, haptic sense, and the like, by causing the HMI to operate in a manner determined on the basis of the driving support information transmitted from the on-board driving support device 21 and the coordination support information transmitted from the coordination support device 6.

Figure 3B:
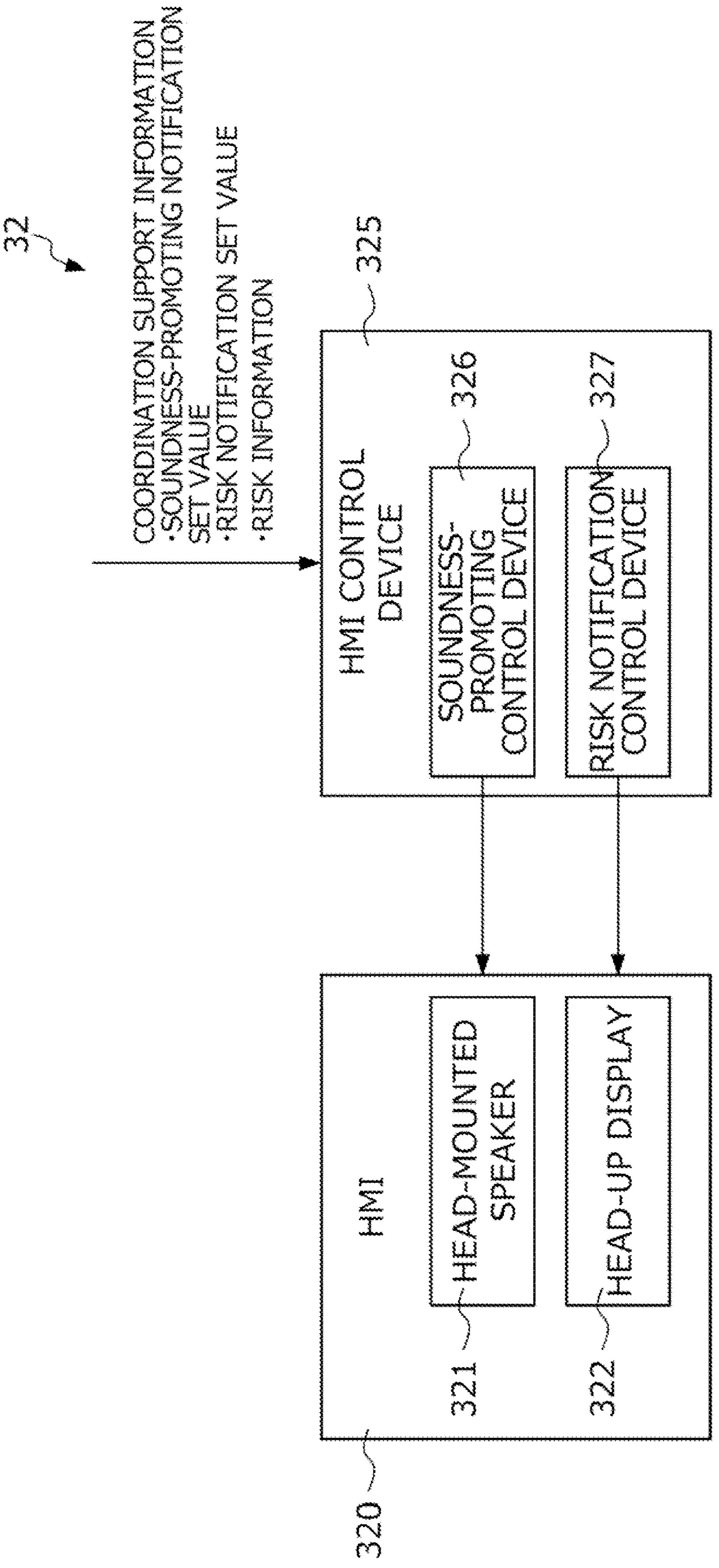
FIG. 3B is a block diagram illustrating a configuration of a notification device mounted on a motorcycle.

FIG. 3B is a block diagram illustrating a configuration of the notification device 32 mounted on the motorcycle. Note that FIG. 3B illustrates, within the notification device 32, only blocks particularly regarding control based on the coordination support information transmitted from the coordination support device 6.

The notification device 32 includes an HMI 320 that operates in a manner recognizable by the rider, and an HMI control device 325 that causes the HMI 320 to operate on the basis of the coordination support information transmitted from the coordination support device 6.

The HMI 320 includes a head-mounted speaker 321 that operates in a manner auditorily recognizable by the rider, and a head-up display 322 that operates in a manner visually recognizable by the rider.

The head-mounted speaker 321 is provided at a helmet to be worn by the rider and is capable of emitting binaural sound having directivity. The head-mounted speaker 321 emits sound in accordance with a command from the HMI control device 325. The head-up display 322 displays an image in accordance with a command from the HMI control device 325 within a field of view (for example, a shield of the helmet) of the rider engaged in driving.

The HMI control device 325 includes a soundness-promoting control device 326 configured to make a soundness-promoting notification for causing the HMI 320 to operate in a manner determined to bring driving capability (particularly, cognitive capability) of the rider into a sound state, and a risk notification control device 327 configured to make a risk notification for causing the HMI 320 to operate in a manner determined to cause the rider to recognize existence of a risk that comes near. As will be described later, the coordination support information to be transmitted from the coordination support device 6 to the motorcycle 3 includes information regarding a soundness-promoting notification set value for setting ON/OFF of soundness-promoting notification by the soundness-promoting control device 326, information regarding a risk notification set value for setting ON/OFF of risk notification by the risk notification control device 327 and a type of the notification mode, risk information regarding a risk that comes near to the rider, and the like.

The soundness-promoting notification set value to be input to the soundness-promoting control device 326 is set at one of "0" for setting OFF of the soundness-promoting notification by the soundness-promoting control device 326 and "1" for setting ON of the soundness-promoting notification by the soundness-promoting control device 326.

In a case where the soundness-promoting notification set value is "0", the soundness-promoting control device 326 sets OFF of the soundness-promoting notification. In other words, in a case where the soundness-promoting notification set value is "0", the soundness-promoting control device 326 does not cause the HMI 320 to operate. Note that this does not inhibit operation of the HMI 320 by the risk notification control device 327.

In a case where the soundness-promoting notification set value is "1", the soundness-promoting control device 326 sets ON of the soundness-promoting notification. More specifically, the soundness-promoting control device 326 brings driving capability of the rider into a sound state by playing music that attracts interest or attention of the rider using, for example, the head-mounted speaker 321. Note that in this event, to increase a degree of awareness of the rider, BPM of the music may be changed, or a bass tone may be emphasized.

In this manner, the soundness-promoting control device 326 causes the HMI 320 to operate to bring driving capability of the rider into a sound state, and thus, in a case where the risk notification by the risk notification control device 327 which will be described later is set ON (that is, in a case where the risk notification set value is "1" or "2"), the soundness-promoting notification may be set OFF so that the driver will not be annoyed.

The risk notification control device 327 can make a risk notification in a plurality of notification modes in which at least one of a device to be caused to operate among those of the HMI 320 or an operation manner is different. More specifically, the risk notification control device 327 can make a risk notification in at least one of a hinting notification mode intended to cause the rider to recognize existence of a potential risk, an analogue notification mode intended to cause the rider to recognize existence of a visible risk and/or a level of the risk, or a prediction-assisted notification mode intended to notify the rider of information useful for avoiding a predicted risk. Thus, as the risk notification set value to be input to the risk notification control device 327, one of "0" for setting OFF of risk notification, "1" for setting ON of risk notification in the hinting notification mode, "2" for setting ON of risk notification in the analogue notification mode, "3" for setting ON of risk notification in the prediction-assisted notification mode, "4" for setting ON of risk notification in the hinting notification mode and the prediction-assisted notification mode, and "5" for setting ON of risk notification in the analogue notification mode and the prediction-assisted notification mode is set.

In a case where the risk notification set value is "0", the risk notification control device 327 sets OFF of risk notification. In other words, in a case where the risk notification set value is "0", the risk notification control device 327 does not cause the HMI 320 to operate. Note that this does not inhibit operation of the HMI 320 by the soundness-promoting control device 326.

In a case where the risk notification set value is "1", the risk notification control device 327 sets the hinting notification mode as the notification mode and turns ON risk notification in the set notification mode.

In a case where the risk notification set value is "2", the risk notification control device 327 sets the analogue notification mode as the notification mode and turns ON risk notification in the set notification mode.

In a case where the risk notification set value is "3", the risk notification control device 327 sets the prediction-assisted notification mode as the notification mode and turns ON risk notification in the set notification mode.

In a case where the risk notification set value is "4", the risk notification control device 327 sets the hinting notification mode and the prediction-assisted notification mode as the notification modes and turns ON risk notification in the set notification modes.

In a case where the risk notification set value is "5", the risk notification control device 327 sets the analogue notification mode and the prediction-assisted notification mode as the notification modes and turns ON risk notification in the set notification modes.

Here, in a case where the prediction-assisted notification mode is set as the notification mode, the risk notification control device 327 generates risk avoidance support information useful for avoiding a risk that comes near to the rider on the basis of the risk information transmitted from the coordination support device 6 and causes the head-mounted speaker 321 and the head-up display 322 of the HMI 320 to operate in such an manner that enables the rider to visually and auditorily recognize the risk avoidance support information. Here, the risk avoidance support information includes information regarding a position of a risk-carrying subject that may come into contact with the own vehicle, information regarding a risk occurrence point and information including content that evokes attention of the rider to the risk-carrying subject.

More specifically, in a case where there is a four-wheeled vehicle driven by an unsound driver ahead of the motorcycle driven by the rider, the risk notification control device 327 causes the head-mounted speaker 321 to emit a message indicating content of "Be careful of dangerous right-turn of the four-wheeled vehicle" or causes the head-up display 322 to display the message as the risk avoidance support information for avoiding contact with the four-wheeled vehicle. Further, in this event, the risk notification control device 327 may cause the head-up display 322 to display an image of an arrow indicating a current position or a predicted position of the four-wheeled vehicle as the risk avoidance support information for avoiding contact with the four-wheeled vehicle.

Further, in a case where the hinting notification mode is set as the notification mode, the risk notification control device 327 causes the rider to spontaneously recognize presence of a risk-carrying subject extracted from the risk information transmitted from the coordination support device 6 by causing the HMI 320 to operate in such a manner as not to annoy the driver. In such a hinting notification mode, to cause the rider to spontaneously recognize presence of the risk-carrying subject without annoying the rider, the risk notification control device 327 preferably causes particularly the head-mounted speaker 321 that appeals to auditory sense of the rider to operate among the plurality of devices included in the HMI 320. More specifically, in a case where the hinting notification mode is set as the notification mode, the risk notification control device 327 spontaneously brings the line of sight of the rider to a position of the risk-carrying subject or the risk occurrence point by causing the head-mounted speaker 321 to emit low-volume familiar sound effect with binaural sound having directivity directed to the position of the risk-carrying subject or the risk occurrence point.

In a case where the analogue notification mode is set as the notification mode, the risk notification control device 327 causes the rider to strongly recognize presence of the risk-carrying subject extracted from the risk information transmitted from the coordination support device 6 and a level of the risk by the risk-carrying subject by causing the HMI 320 to operate in a manner different from the hinting notification mode described above. In this manner, in the analogue notification mode, to cause the rider to strongly recognize presence of the risk-carrying subject, the HMI control device 325 causes the HMI 320 to operate in a manner with notification intensity higher than notification intensity in a manner set in the hinting notification mode. More specifically, in a case where the analogue notification mode is set as the notification mode, the risk notification control device 327 causes the head-mounted speaker 321 to emit buzzer sound or pulse sound at larger volume than a volume of the sound effect emitted in the hinting notification mode. The buzzer sound and the pulse sound are unfamiliar high-volume sound for the rider compared to the sound effect emitted in the hinting notification mode, and thus, the notification intensity is higher than the notification intensity of the sound effect emitted in the hinting notification mode.

Further, as described above, to cause the rider to strongly recognize the level of the risk by the risk-carrying subject in addition to presence of the risk-carrying subject, the risk notification control device 327 preferably changes the notification intensity in accordance with the level of the risk by the risk-carrying subject (e.g., the length of a predicted period until a possible collision with the risk-carrying subject) extracted from the risk information transmitted from the coordination support device 6. Specifically, the risk notification control device 327 may increase the notification intensity by increasing a volume of the buzzer sound, increasing a volume of the pulse sound or shortening an interval of the pulse sound as the level of the risk becomes higher (i.e., as the predicted period until the possible collision with the risk-carrying subject shortens).

Further, in a case where the notification intensity is changed in accordance with the level of the risk in this manner, the risk notification control device 327 preferably causes the HMI 320 to operate so that the notification intensity becomes maximum at a time point at which execution of collision mitigation brake control is started by the driving support ECU described above, in other words, at a time point at which the risk-carrying subject enters the ADAS actuation range.

Returning to FIG. 2, the portable information processing terminal 40 possessed or worn by the pedestrian 4 in the target traffic area 9 includes, for example, a wearable terminal to be worn by the pedestrian 4, a smartphone possessed by the pedestrian 4, and the like. The wearable terminal has a function of measuring biological information of the pedestrian 4 such as a heart rate, a blood pressure and a blood oxygen level and transmitting the measurement data of the biological information to the coordination support device 6 and receiving the coordination support information transmitted from the coordination support device 6. Further, the smartphone has a function of transmitting pedestrian information regarding the pedestrian 4 such as position information, travel acceleration, schedule information, and the like, of the pedestrian 4 to the coordination support device 6 and receiving the coordination support information transmitted from the coordination support device 6.

Further, the portable information processing terminal 40 includes a notification device 42 that notifies the pedestrian of various kinds of information through auditory sense, visual sense, haptic sense, and the like, of the pedestrian by causing the HMI to operate in a manner determined on the basis of the received coordination support information.

Figure 3C:
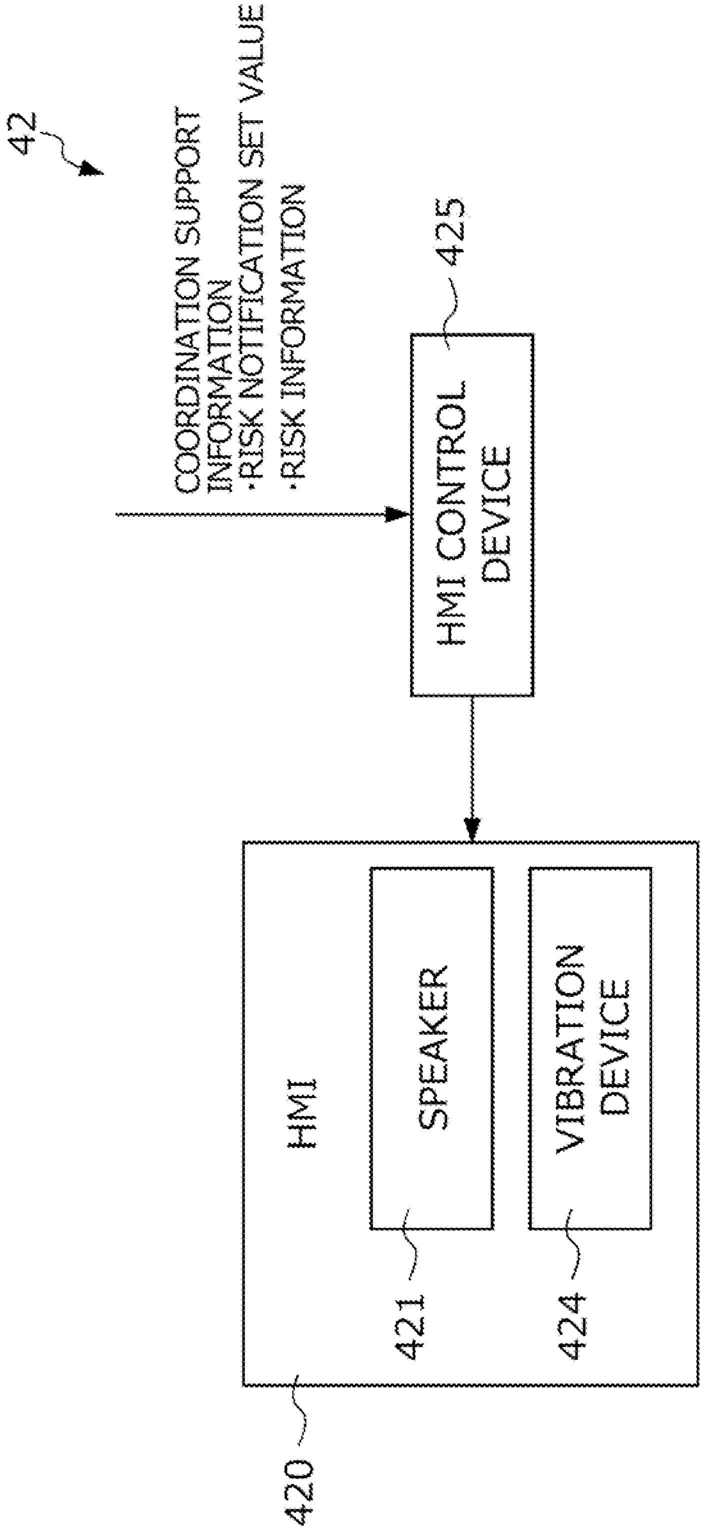
FIG. 3C is a block diagram illustrating a configuration of a notification device mounted on a portable information processing terminal possessed by a pedestrian.

FIG. 3C is a block diagram illustrating a configuration of the notification device 42 mounted on the portable information processing terminal 40. Note that FIG. 3C illustrates, within the notification device 42, only blocks particularly regarding control based on the coordination support information transmitted from the coordination support device 6.

The notification device 42 includes an HMI 420 that operates in a manner recognizable by the pedestrian, and an HMI control device 425 that causes the HMI 420 to operate on the basis of the coordination support information transmitted from the coordination support device 6.

The HMI 420 includes a speaker 421 that operates in a manner auditorily recognizable by the pedestrian, and a vibration device 424 that operates in a manner haptically recognizable by the pedestrian.

The speaker 421 emits sound in accordance with a command from the HMI control device 425. The vibration device 424 vibrates a body of the portable information processing terminal 40 at an amplitude and/or a frequency in a manner in accordance with a command from the HMI control device 425.

As will be described later, the coordination support information transmitted from the coordination support device 6 to the portable information processing terminal 40 possessed by the pedestrian includes information regarding a risk notification set value for setting ON/OFF of risk notification and a type of the notification mode to be set by the HMI control device 425, risk information regarding a risk that comes near to the pedestrian, and the like.

The HMI control device 425 can make a risk notification in a plurality of notification modes in which at least one of a device to be caused to operate among those of the HMI 420 or an operation manner is different. More specifically, the HMI control device 425 can make a risk notification in at least one of a hinting notification mode intended to cause the pedestrian to recognize existence of a potential risk or an analogue notification mode intended to cause the pedestrian to recognize existence of a visible risk and/or a level of the risk. Thus, as the risk notification set value to be input to the HMI control device 425, one of "0" for setting OFF of risk notification by the HMI control device 425, "1" for setting ON of the risk notification by the HMI control device 425 and setting the hinting notification mode as the notification mode and "2" for setting ON of risk notification by the HMI control device 425 and setting the analogue notification mode as the notification mode is set.

In a case where the risk notification set value is "0", the HMI control device 425 sets OFF of risk notification. In other words, in a case where the risk notification set value is "0", the HMI control device 425 does not cause the HMI 420 to operate.

In a case where the risk notification set value is "1", the HMI control device 425 sets the hinting notification mode as the notification mode and turns ON risk notification in the set notification mode.

In a case where the risk notification set value is "2", the HMI control device 425 sets the analogue notification mode as the notification mode and turns ON risk notification in the set notification mode.

Here, the HMI control device 425 causes the pedestrian to spontaneously recognize presence of a risk-carrying subject extracted from the risk information transmitted from the coordination support device 6 by causing the HMI 420 to operate in such a manner as not to annoy the pedestrian. More specifically, in a case where the hinting notification mode is set as the notification mode, the HMI control device 425 vibrates the body of the portable information processing terminal 40 at a predetermined amplitude and frequency by causing the vibration device 424 to operate.

Further, in a case where the analogue notification mode is set as the notification mode, the HMI control device 425 causes the pedestrian to strongly recognize presence of a risk-carrying subject extracted from the risk information transmitted from the coordination support device 6 and a level of a risk by the risk-carrying subject by causing the HMI 420 to operate in a manner different from the hinting notification mode described above. In this manner, in the analogue notification mode, to cause the pedestrian to strongly recognize presence of the risk-carrying subject, the HMI control device 425 causes the HMI 420 to operate in a manner with notification intensity higher than notification intensity in a manner set in the hinting notification mode. More specifically, in a case where the analogue notification mode is set as the notification mode, the HMI control device 425 causes the speaker 421 to emit buzzer sound, pulse sound, a message indicating that there is a risk, or the like.

Further, as described above, in the analogue notification mode, to cause the pedestrian to strongly recognize a level of the risk by the risk-carrying subject in addition to presence of the risk-carrying subject, the HMI control device 425 preferably changes the notification intensity in accordance with the level of the risk by the risk-carrying subject (e.g., the length of a predicted period until a possible collision with the risk-carrying subject) extracted from the risk information transmitted from the coordination support device 6. Specifically, the HMI control device 425 may increase the notification intensity by increasing a volume of the buzzer sound, increasing a volume of the pulse sound, shortening an interval of the pulse sound, increasing a volume of the message or changing content of the message as the level of the risk becomes higher (i.e., as the predicted period until the possible collision with the risk-carrying subject shortens).

Returning to FIG. 2, the infrastructure camera 56 captures images of traffic infrastructure equipment including a road, an intersection and a pavement in a target traffic area and mobile bodies and pedestrians that move on the road, the intersection, the pavement, and the like, and transmits the obtained image information to the coordination support device 6.

The traffic light control device 55 controls the traffic lights and transmits traffic light state information regarding current lighting color of the traffic lights provided in the target traffic area, a timing at which the lighting color is switched, and the like, to the coordination support device 6.

The coordination support device 6 is a computer that supports safe and smooth traffic of the traffic participants in the target traffic area by generating coordination support information for encouraging communication between the traffic participants and recognition of a surrounding traffic environment for each traffic participant to be supported on the basis of the information acquired from a plurality of area terminals present in the target traffic area as described above and notifying each traffic participant. Note that in the present embodiment, traffic participants including means for receiving the coordination support information generated at the coordination support device 6 and causing the HMI to operate in a manner set on the basis of the received coordination support information (for example, the on-board equipment 20 and 30, the portable information processing terminal 40 and the notification devices 22, 32 and 42) among the plurality of traffic participants present in the target traffic area are set as targets to be supported by the coordination support device 6.

The coordination support device 6 includes a target traffic area recognizer 60 configured to recognize persons and mobile bodies in the target traffic area as individual traffic participants, a driving subject information acquirer 61 configured to acquire driving subject state information correlated with driving capability of driving subjects of the mobile bodies recognized as the traffic participants by the target traffic area recognizer 60, a predictor 62 configured to predict futures of the traffic participants in the target traffic area, a soundness-promoting notification specifier 63 configured to set ON/OFF of the soundness-promoting notification for each of the traffic participants recognized as support targets by the target traffic area recognizer 60, a risk notification specifier 64 configured to set a notification mode of the risk notification for each of the traffic participants recognized as the support targets by the target traffic area recognizer 60, a coordination support information notifier 65 configured to transmit coordination support information generated for each of the traffic participants recognized as the support targets by the target traffic area recognizer 60, a traffic environment database 67 in which information regarding traffic environments of the target traffic area is accumulated, and a driving history database 68 in which information regarding past driving history by the driving subjects registered in advance is accumulated.

In the traffic environment database 67, information regarding traffic environments of the traffic participants in the target traffic area such as map information of the target traffic area registered in advance (for example, a width of the road, the number of lanes, speed limit, a width of the pavement, whether or not there is a guardrail between the road and the pavement, a position of a crosswalk) and risk area information regarding a high risk area with a particularly high risk in the target traffic area, is stored. In the following description, the information stored in the traffic environment database 67 will be also referred to as registered traffic environment information.

In the driving history database 68, information regarding past driving history of the driving subjects registered in advance is stored in association with registration numbers of mobile bodies possessed by the driving subjects. Thus, if the registration numbers of the recognized mobile bodies can be specified by the target traffic area recognizer 60 which will be described later, the past driving history of the driving subjects of the recognized mobile bodies can be acquired by searching the driving history database 68 on the basis of the registration numbers. In the following description, the information stored in the driving history database 68 will also be referred to as registered driving history information.

The target traffic area recognizer 60 recognizes traffic participants that are persons or mobile bodies in the target traffic area and recognition targets including traffic environments of the respective traffic participants in the target traffic area on the basis of the information transmitted from the above-described area terminal (the on-board equipment 20 and 30, the portable information processing terminal 40, the infrastructure camera 56 and the traffic light control device 55) in the target traffic area and the registered traffic environment information read from the traffic environment database 67 and acquires recognition information regarding the recognition targets.

Here, the information transmitted from the on-board driving support device 21 and the on-board communication device 24 included in the on-board equipment 20 to the target traffic area recognizer 60 and the information transmitted from the on-board driving support device 31 and the on-board communication device 34 included in the on-board equipment 30 to the target traffic area recognizer 60 include information regarding traffic participants present near the own vehicle and a state regarding the traffic environment acquired by the external sensor, information regarding a state of the own vehicle as one traffic participant acquired by the own vehicle state sensor, the navigation device and the like, and the like. Further, the information transmitted from the portable information processing terminal 40 to the target traffic area recognizer 60 includes information regarding a state of a pedestrian as one traffic participant, such as a position and travel acceleration. Still further, the image information transmitted from the infrastructure camera 56 to the target traffic area recognizer 60 includes information regarding the respective traffic participants and traffic environments of the traffic participants, such as appearance of the traffic infrastructure equipment such as the road, the intersection and the pavement, and appearance of traffic participants moving in the target traffic area. Further, the traffic light state information transmitted from the traffic light control device 55 to the target traffic area recognizer 60 includes information regarding traffic environments of the respective traffic participants such as current lighting color of the traffic lights and a timing for switching the lighting color. Further, the registered traffic environment information to be read by the target traffic area recognizer 60 from the traffic environment database 67 includes information regarding traffic environments of the respective traffic participants such as map information, the risk area information, and the like, of the target traffic area.

Thus, the target traffic area recognizer 60 can acquire recognition information of each traffic participant (hereinafter, also referred to as "traffic participant recognition information") such as a position of each traffic participant in the target traffic area, moving speed, moving acceleration, direction of movement, a vehicle type of the mobile body, a vehicle rank, registration number of the mobile body, the number of people of the pedestrian and an age group of the pedestrian on the basis of the information transmitted from the area terminals. Further, the target traffic area recognizer 60 can acquire recognition information of the traffic environment (hereinafter, also referred to as "traffic environment recognition information") of each traffic participant in the target traffic area such as a width of the road, the number of lanes, speed limit, a width of the pavement, whether or not there is a guardrail between the road and the pavement, lighting color of the traffic light, a switching timing of the lighting color, and the risk area information on the basis of the information transmitted from the area terminals.

Thus, in the present embodiment, the recognizer that recognizes the traffic participants in the target traffic area and the traffic environments includes the target traffic area recognizer 60, the on-board driving support device 21, the on-board communication device 24 and the portable information processing terminal 25 included in the on-board equipment 20 of the four-wheeled vehicle 2, the on-board driving support device 31, the on-board communication device 34 and the portable information processing terminal 35 included in the on-board equipment 30 of the motorcycle 3, the portable information processing terminal 40 of the pedestrian, the infrastructure camera 56, the traffic light control device 55 and the traffic environment database 67.

The target traffic area recognizer 60 transmits the traffic participant recognition information and the traffic environment recognition information acquired as described above to the driving subject information acquirer 61, the predictor 62, the soundness-promoting notification specifier 63, the risk notification specifier 64, the coordination support information notifier 65, and the like.

The driving subject information acquirer 61 acquires driving subject state information and driving subject characteristic information correlated with current driving capabilities of the driving subjects of the mobile bodies recognized as the traffic participants by the target traffic area recognizer 60 on the basis of the information transmitted from the above-described area terminals (particularly, the on-board equipment 20 and 30) in the target traffic area and the registered driving history information read from the driving history database 68.

More specifically, in a case where the driving subject of the four-wheeled vehicle recognized as the traffic participant by the target traffic area recognizer 60 is a person, the driving subject information acquirer 61 acquires the information transmitted from the on-board equipment 20 mounted on the four-wheeled vehicle as driving subject state information of the driver. Further, in a case where the driving subject of the motorcycle recognized as the traffic participant by the target traffic area recognizer 60 is a person, the driving subject information acquirer 61 acquires the information transmitted from the on-board equipment 30 mounted on the motorcycle as driving subject state information of the rider.

Here, the information to be transmitted from the driving subject state sensor 23 and the on-board communication device 24 included in the on-board equipment 20 to the driving subject information acquirer 61 includes time-series data regarding appearance information such as a direction of a line of sight of the driver engaged in driving and whether or not the driver opens his/her eyes, biological information such as a pulse, whether or not the driver breathes, and a skin potential, speech information such as whether or not there is conversation, and the like, which is correlated with driving capability of the driver engaged in driving. Further, the information to be transmitted from the rider state sensor 33 and the on-board communication device 34 included in the on-board equipment 30 to the driving subject information acquirer 61 includes time-series data regarding biological information such as a pulse of the rider, whether or not the rider breathes and a skin potential, which is correlated with driving capability of the rider engaged in driving. Further, the information to be transmitted from the portable information processing terminals 25 and 35 included in the on-board equipment 20 and 30 to the driving subject information acquirer 61 includes personal schedule information of the driver and the rider. In a case where the driver and the rider drive the mobile bodies, for example, under tight schedule, there is a case where the driver and the rider may feel pressed, and driving capabilities may degrade. Thus, it can be said that the personal schedule information of the driver and the rider is information correlated with the driving capabilities of the driver and the rider.

The driving subject information acquirer 61 acquires driving subject characteristic information regarding characteristics (such as, for example, too many times of sudden lane change and too many times of sudden acceleration and deceleration) regarding driving of the driving subject correlated with current driving capability of the driving body engaged in driving by using both or one of the driving subject state information for the driving subject acquired through the following procedure and the registered driving history information read from the driving history database 68.

The driving subject information acquirer 61 transmits the driving subject state information and the driving subject characteristic information of the driving subject acquired as described above to the predictor 62, the soundness-promoting notification specifier 63, the risk notification specifier 64, the coordination support information notifier 65 and the like.

The predictor 62 extracts part of the traffic area in the target traffic area as a monitoring area and predicts future risks among a plurality of traffic participants in the monitoring area on the basis of the traffic participant recognition information and the traffic environment recognition information acquired by the target traffic area recognizer 60 and the driving subject state information and the driving subject characteristic information acquired by the driving subject information acquirer 61. More specifically, the predictor 62 predicts future of the traffic participants in the monitoring area by constructing a virtual space that simulates the monitoring area on the basis of the traffic participant recognition information and the traffic environment recognition information acquired by the target traffic area recognizer 60 and performing simulation on the virtual space on the basis of the traffic participant recognition information, the traffic environment recognition information, the driving subject state information and the driving subject characteristic information.

Here, the target traffic area is a traffic area of a relatively broad range determined, for example, in municipal units. In contrast, the monitoring area is a traffic area such as, for example, an area near an intersection and a specific facility, through which a four-wheeled vehicle can pass in an approximately few tens of seconds in a case where the four-wheeled vehicle travels at legal speed. In other words, the monitoring area is narrower than the target traffic area, but is broader than the ADAS actuation range of the driving support ECU mounted on each mobile body.

Figure 4:
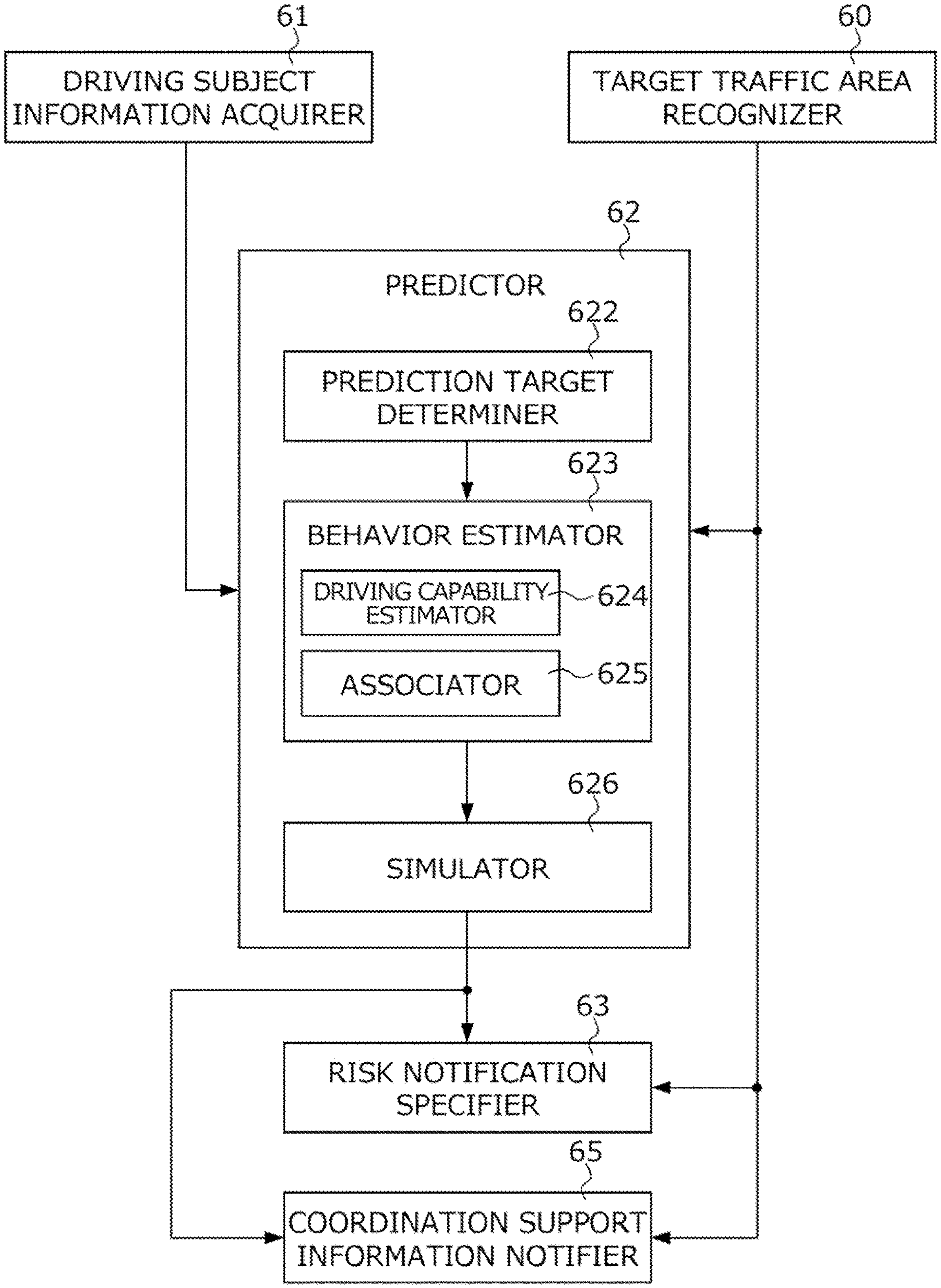
FIG. 4 is a functional block diagram illustrating a specific configuration of a predictor.

FIG. 4 is a functional block diagram illustrating a specific configuration of the predictor 62. The predictor 62 includes a prediction target determiner 622, a behavior estimator 623 and a simulator 626 and predicts a risk in future of a plurality of prediction targets in the monitoring area by using these.

The prediction target determiner 622 extracts N traffic participants (where N is an arbitrary integer equal to or greater than 2) present in the monitoring area among the plurality of traffic participants recognized by the target traffic area recognizer 60 and determines the extracted first traffic participant, second traffic participant, third traffic participant, . . . , N-th traffic participant as prediction targets.

The behavior estimator 623 specifies mobile bodies among the first to N-th traffic participants determined as the prediction targets by the prediction target determiner 622 on the basis of the traffic participant recognition information and the traffic environment recognition information (hereinafter, also collectively referred to as "recognition information") acquired by the target traffic area recognizer 60 and the driving subject state information and the driving subject characteristic information (hereinafter, also collectively referred to as "driving subject information") acquired by the driving subject information acquirer 61 and estimates a behavior that can be performed in future by the driving subject of each mobile body recognized as the traffic participant. The behavior estimator 623, in which behaviors that can be performed in the future by the driving subjects are determined in advance as a plurality of pattern behaviors, estimates a behavior that can be performed by the driving subject of each mobile body by associating a behavior estimation input including at least the recognition information between the recognition information and the driving subject information with at least one of the plurality of pattern behaviors determined in advance.

Here, the pattern behaviors that can be performed by the driving subject include, for example, unintentional behaviors of the driving subject such as delay in forward perception, delay in backward perception and delay in lateral perception, in addition to intentional behaviors of the driving subject such as acceleration operation, deceleration operation, steering operation, lane keeping operation, surrounding confirmation action, and lane change operation.

The behavior estimator 623 includes a driving capability estimator 624 configured to estimate decrease of driving capability of the driving subject for each of capability elements determined in advance in view of a surrounding traffic environment including other traffic participants on the basis of the above-described behavior estimation input, and an associator 625 configured to associate a capability element estimated to decrease by the driving capability estimator 624 with at least one of the above-described plurality of pattern behaviors in view of the traffic environment and determines a behavior that can be performed in future by the driving subject of each mobile body from the plurality of pattern behaviors by using the driving capability estimator 624 and the associator 625.

Here, the driving capability estimator 624 divides driving capability that the driving subject should have to appropriately drive the mobile body into at least four capability elements of cognitive capability, prediction capability, determination capability and operation capability. The cognitive capability is capability of the driving subject to appropriately recognize an own vehicle, a traffic environment around the own vehicle and states of traffic participants. The prediction capability is capability of the driving subject to appropriate predict change of the own vehicle, the traffic environment around the own vehicle and the traffic participants. The determination capability is capability of the driving subject to appropriately perform determination in accordance with the own vehicle, the surrounding traffic environment and the states of the traffic participants. Further, the operation capability is capability of the driving subject to appropriately operate the own vehicle. The behaviors that can be performed by the driving subject differ in accordance with the decreasing capability element. Thus, the behavior estimator 623 can narrow down the number of pattern behaviors to be associated with the behavior estimation input by estimating decrease of the driving capability of the driving subject for each of the above-described capability elements on the basis of the behavior estimation input as described above.

The behavior estimator 623 estimates a future behavior of the driving subject of each mobile body recognized as the traffic participant by the target traffic area recognizer 60 among the plurality of prediction targets through the procedure described above.

The simulator 626 predicts a future behavior of each of the first to N-th traffic participants determined as prediction targets and a contact risk that can occur in the future of each of the first to N-th traffic participants by constructing a virtual space that simulates the target traffic area on the basis of the recognition information and performing simulation based on the recognition information and the driving subject information on the virtual space. More specifically, the simulator 626 predicts a behavior of each of the first to N-th traffic participants determined as the prediction targets from the present to the future that is a predetermined prediction period from the present time and a contact risk of each traffic participant from the present to the future that is the prediction period from the present time by performing simulation based on the recognition information for the first to N-th traffic participants and the pattern behavior that is associated by the behavior estimator 623 for each driving subject of each mobile body, on the virtual space constructed on the basis of the recognition information.

Returning to FIG. 2, the predictor 62 predicts the behaviors and the contact risk for the plurality of prediction targets through the procedure described above, and then, transmits information regarding the prediction results (for example, information regarding a position of a point at which the contact risk is to occur, information regarding positions, speed and moving trajectories of parties who are involved in the contact risk, and a period until the contact risk is predicted to occur (i.e., a predicted period until a possible collision)) to the risk notification specifier 64 and the coordination support information notifier 65.

The soundness-promoting notification specifier 63 sets ON/OFF of the soundness-promoting notification for each of setting targets that are traffic participants recognized as support targets and mobile bodies by the target traffic area recognizer 60 among the plurality of traffic participants present in the target traffic area. Note that as will be described later, the traffic participants that are parties involved in the contact risk predicted to occur by the predictor 62 described above become setting targets of risk notifications by the risk notification specifier 64. It is therefore preferable to exclude the setting targets by the risk notification specifier 64 from setting targets by the soundness-promoting notification specifier 63.

More specifically, first, the soundness-promoting notification specifier 63 acquires driving subject state information and driving subject characteristic information associated with the driving subject of each setting target that is a mobile body from the driving subject information acquirer 61. Further, the soundness-promoting notification specifier 63 calculates current soundness of the driving subject for each of the setting targets on the basis of the acquired driving subject state information and driving subject characteristic information. Further, in a case where the soundness calculated for each setting target is less than a predetermined soundness threshold, the soundness-promoting notification specifier 63 determines that the driving subject of the setting target is in an unsound state and sets the soundness-promoting notification set value for the setting target to “1” to set ON of the soundness-promoting notification to the setting target. Further, in a case where the soundness calculated for each setting target is equal to or greater than the soundness threshold, the soundness-promoting notification specifier 63 determines that the driving subject of the setting target is in a sound state and sets the soundness-promoting notification set value for the setting target to “0” to set OFF of the soundness-promoting notification of the setting target.

The soundness-promoting notification specifier 63 sets ON or OFF of the soundness-promoting notification for the plurality of setting targets in the target traffic area through the procedure as described above. Information regarding the soundness-promoting notification set value set for each setting target by the soundness-promoting notification specifier 63 is transmitted to the coordination support information notifier 65.

The risk notification specifier 64 sets an operation manner (that is, a type of the notification mode and ON/OFF of the risk notification) of the risk notification for each of setting targets that are traffic participants recognized as support targets by the target traffic area recognizer 60 among the plurality of traffic participants present in the monitoring area extracted from the target traffic area by the predictor 62 on the basis of the prediction result from the predictor 62, the recognition information acquired by the target traffic area recognizer 60, the driving subject information acquired by the driving subject information acquirer 61, and the like.

More specifically, the risk notification specifier 64 sets an operation manner of the risk notification for each of the setting targets present in the monitoring area on the basis of information related to the monitoring area among the recognition information acquired by the target traffic area recognizer 60, information related to the monitoring area among the driving subject information acquired by the driving subject information acquirer 61 and the prediction result for the monitoring area by the predictor 62. In other words, the risk notification specifier 64 sets the risk notification set value to one of “0”, “1”, “2”, “3” and “4” for each of the setting targets.

In this manner, in a case where, for example, occurrence of a contact risk of parties that are a plurality of setting targets in the monitoring area is predicted by the predictor 62, the risk notification specifier 64 can set ON/OFF of the risk notification for a plurality of prediction parties predicted to be involved in the contact risk at timings different from each other or can make risk notifications in different notification modes at the same time to set an operation manner of the risk notification for each of the setting targets present in the monitoring area. Hereinafter, processing of setting an appropriate operation manner of the risk notification for each of the setting targets by the risk notification specifier 64 will be also referred to as "risk notification optimization processing".

Figure 5:
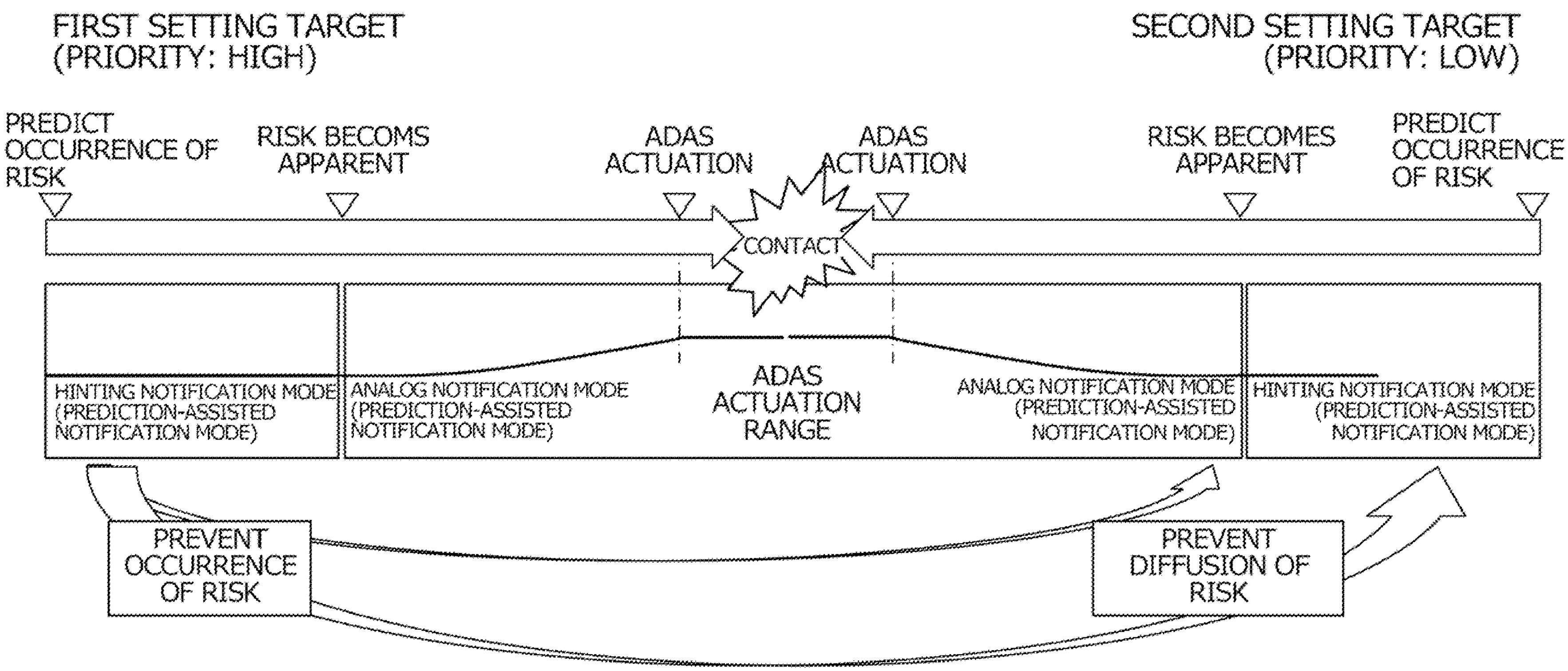
FIG. 5 is a view schematically illustrating concept of risk notification optimization processing in a risk notification specifier.

FIG. 5 is a view schematically illustrating concept of the risk notification optimization processing at the risk notification specifier 64. Note that while in the following description, procedure of the risk notification optimization processing will be described using a case as an example where occurrence of a contact risk between two parties (that is, a first setting target (mobile body) and a second setting target (mobile body)) is predicted by the predictor 62, the present invention is not limited to this. The present invention can be easily generalized to a case where a contact risk of two parties, one of which is a pedestrian, is predicted and a case where occurrence of a contact risk among three parties is predicted, and thus, description will be omitted.

Further, a left part of FIG. 5 schematically indicates transition of the operation manner of the risk notification in the first setting target, and a right part of FIG. 5 schematically indicates transition of the operation manner of the risk notification in the second setting target. Further, two arrows at the top of FIG. 5 conceptually indicate a period from when occurrence of the contact risk is predicted by the predictor 62 for the first time until when the first setting target comes into contact with the second setting target, that is, a predicted period until a possible collision. However, these two arrows only conceptually indicate the predicted period until a possible collision and do not mean that the risk notification optimization processing at the risk notification specifier 64 cannot be executed unless the predicted period until a possible collision is clearly calculated at the predictor 62. The risk notification optimization processing at the risk notification specifier 64 can be executed before the predicted period until a possible collision is clearly calculated by the predictor 62. Further, FIG. 5 indicates a case where the risk notification of the first setting target and the second setting target is set OFF (that is, the risk notification set value is "0") at a time point at which occurrence of the contact risk is predicted by the predictor 62 for the first time.

In a case where occurrence of a contact risk of parties that are a plurality of support targets is predicted in the monitoring area by the predictor 62, the risk notification specifier 64 sets priority to the plurality of prediction parties (in the example of FIG. 5, the first setting target and the second setting target) that are involved in the contact risk on the basis of content of the contact risk predicted by the predictor 62 for the first time. The priority specifies order of setting ON of the risk notification (particularly, the risk notification under a hinting notification mode) as will be described later, and the risk notification is set ON earlier for the setting target for which the priority is set higher than the setting target for which the priority is set lower. Note that FIG. 5 illustrates a case where the priority of the first setting target is set higher than the priority of the second setting target.

Here, the risk notification specifier 64 sets priority for each of the setting targets so as to avoid the predicted contact risk from becoming apparent or occurring and prevent disorder of a traffic stream among these setting targets. More specifically, the risk notification specifier 64, for example, may specify a risk inducer that induces the contact risk among, for example, a plurality of prediction parties involved in the contact risk by referring to the prediction result from the predictor 62, the recognition information by the target traffic area recognizer 60, the driving subject information by the driving subject information acquirer 61, and the like, and may set priority higher to the risk inducer than priority set to other prediction parties except the risk inducer. By setting the priority of the risk inducer higher in this manner and setting ON of the risk notification earlier than the risk notification to other setting targets, action of the risk inducer can be changed before the risk notification to other setting targets is set ON, so that it is possible to avoid the contact risk predicted at the beginning from becoming apparent or occurring.

Here, examples of the risk inducer can include a person who performs action that is highly likely to induce the contact risk as described above (for example, sudden acceleration, sudden deceleration, sudden lane change, interruption, action of closing a distance to a preceding vehicle or subsequent vehicle, action of continuously traveling across lanes, swerving, wrong-way driving, ignoring a traffic light, action of traveling at higher speed than surrounding mobile bodies by equal to or greater than predetermined speed, action of traveling at lower speed than surrounding mobile bodies by equal to or greater than predetermined speed, action of traveling at higher speed than speed limit by equal to or greater than predetermined speed, action of traveling at lower speed than speed limit by equal to or greater than predetermined speed, and action of inhibiting movement of surrounding traffic participants).

Further, the risk notification specifier 64 may set priority on the basis of traffic environments of the individual setting targets. More specifically, priority may be set higher to a prediction party that is in a traffic environment where it is difficult to recognize presence of other prediction parties among the plurality of prediction parties than priority set to other prediction parties, and the risk notification may be set ON earlier than the risk notification set to other setting targets. This makes it possible to improve cognitive capability of the setting target for which the priority is set higher, so that it is possible to avoid the contact risk predicted at the beginning from becoming apparent or occurring.

The risk notification specifier 64 determines whether or not the contact risk predicted at the beginning becomes apparent with a predetermined period after the priority is set for each of the setting targets through the procedure as described above in response to occurrence of the contact risk being predicted by the predictor 62. More specifically, in a case where, for example, occurrence of the contact risk is predicted by the predictor 62 and in a case where a predicted period until a possible collision for the contact risk is equal to or greater than a predetermined apparent threshold (including a case where the predicted period until a possible collision is not clearly calculated by the predictor 62), the risk notification specifier 64 determines that the contact risk does not become apparent (that is, the contact risk is potential). Further, for example, in a case where the predicted period until a possible collision calculated by the predictor 62 becomes less than the above-described apparent threshold, the risk notification specifier 64 determines that the contact risk becomes apparent. Here, as illustrated in FIG. 5, the apparent threshold that is a threshold for the predicted period until a possible collision is set so as to be wider than an ADAS actuation range, in other words, longer than a predicted period until a possible collision during which execution of collision mitigation brake control, collision avoidance steering control, and the like, are started by the driving support ECU mounted on each mobile body.

Further, the risk notification specifier 64 starts the risk notification in the hinting notification mode preferentially to a setting target for which the priority is set higher (in the example in FIG. 5, the first setting target) until it is determined that the contact risk predicted at the beginning becomes apparent, that is, while it is determined that the contact risk is potential. In other words, the risk notification specifier 64 sets the risk notification set value to "1" or "3" preferentially to setting targets for which the priority is set higher. By this means, there is a case where a driver who is a setting target and who receives a risk notification in this hinting notification mode performs action of avoiding the predicted contact risk as a result of recognizing presence of a mobile body (in the example in FIG. 5, the second setting target) that is likely to come into contact with the own vehicle. In a case where the driver who receives such a risk notification performs action of avoiding the contact risk, there is a case where the predictor 62 predicts that the contact risk predicted to occur at the beginning does not occur before the contact risk becomes apparent.

Further, the risk notification specifier 64 starts the risk notification to the setting target for which the priority is set lower (in the example in FIG. 5, the second setting target) in the hinting notification mode a predetermined period after the risk notification to the setting target for which the priority is set higher is started in the hinting notification mode. In other words, the risk notification specifier 64 sets the risk notification set value to the setting target for which the priority is set lower to "1" or "3" a predetermined period after the risk notification set value to the setting target for which the priority is set higher to "1" or "3". Note that the risk notification specifier 64 may avoid the risk notification to the setting target for which the priority is set lower in the hinting notification mode until the contact risk becomes apparent to prevent disorder of a traffic current of the setting target for which the priority is set lower. Further, by making the risk notification to the setting target for which higher priority is set in the hinting notification mode earlier as described above, there is a case where occurrence of the contact risk is avoided, and thus, the risk notification specifier 64 may start the risk notification to the setting target for which lower priority is set in the hinting notification mode in a case where the driver of the setting target for which higher priority is set does not perform action of avoiding the contact risk even after a predetermined period has elapsed after the risk notification to the setting target for which higher priority is set is started in the hinting notification mode.

Further, the risk notification specifier 64 starts the risk notification to all the prediction parties involved in the contact risk in the analogue notification mode after it is determined that the contact risk predicted at the beginning becomes apparent. In other words, the risk notification specifier 64 sets the risk notification set values for all the prediction parties to "2" or "4" after it is determined that the contact risk becomes apparent. As described above, in the analogue notification mode, the notification intensity becomes higher as the predicted period until a possible collision shortens, so that it is possible to give a sense of danger with respect to the contact risk that comes near to all the prediction parties involved in the contact risk and cause the prediction parties to perform action for avoiding the contact risk.

Returning to FIG. 2, the coordination support information notifier 65 generates coordination support information for encouraging individual traffic participants recognized as the support targets by the target traffic area recognizer 60 to perform communication among the surrounding traffic participants and recognize surrounding traffic environments on the basis of the recognition information acquired by the target traffic area recognizer 60, the driving subject information acquired by the driving subject information acquirer 61, the prediction result from the predictor 62, information regarding the soundness-promoting set value set by the soundness-promoting notification specifier 63 and information regarding the risk notification set value set by the risk notification specifier 64 and transmits the generated coordination support information to each traffic participant.

Here, the coordination support information to be transmitted from the coordination support information notifier 65 to each support target includes the information regarding the soundness-promoting set value, the information regarding the risk notification set value, and risk information regarding the risk that comes near to each support target. Here, the risk information includes, for example, the prediction result from the predictor 62, information regarding positions of the traffic participants present near around each traffic participant, and the like.

According to the traffic safety support system 1 according to the present embodiment, the following effects are provided.

(1) The traffic safety support system 1 includes on-board equipment 20 and 30 and the portable information processing terminal 40 (hereinafter, these are also collectively referred to as a "mobile terminal") that move with the traffic participants in the target traffic area 9, and the coordination support device 6 capable of communicating with the mobile terminals 20, 30 and 40. Further, in the traffic safety support system 1, by acquiring recognition information regarding recognition targets including respective traffic participants in the target traffic area 9 and the traffic environments of traffic participants and predicting a risk in future of the prediction targets within a monitoring area through simulation based on the recognition information by the coordination support device 6, it is possible to predict existence of a potential risk for the individual traffic participants. Further, in the traffic safety support system 1, by setting an operation manner of the risk notification for each of the support targets on the basis of such a prediction result from the predictor 62 and transmitting the setting result to each of the support targets, the risk notifications can be made to the individual support targets before a risk that potentially exists for the individual support targets becomes apparent, and thus, each support target can perform action for avoiding the risk with time to spare, so that it is possible to improve safety, convenience and smoothness of traffic by a plurality of traffic participants in the target traffic area 9. Further, in the traffic safety support system 1, by setting the operation manner of the risk notification for each of the support targets by the risk notification specifier 64, the operation manner of the risk notification can be optimized for each of the support targets, which makes it possible to prevent disorder of a traffic stream as a result of excessive risk notifications being made to support targets in a state or an environment where the risk notification is not required, so that it is possible to improve convenience and smoothness as well as safety of traffic.

(2) In a case where the predictor 62 predicts occurrence of a contact risk of parties that are a plurality of support targets in the monitoring area, the risk notification specifier 64 sets priority to a plurality of prediction parties involved in the contract risk on the basis of content of the contact risk and sets ON of the risk notification earlier to prediction parties with higher priority than prediction parties with lower priority. By this means, for example, by setting the priority higher to prediction parties that are effective for preventing occurrence of the contact risk among the plurality of prediction parties that can be involved in the same contact risk and making the risk notification earlier, it is possible to prevent the contact risk from becoming apparent or occurring before the risk notification is made to prediction parties with the lower priority thereafter. Thus, according to the traffic safety support system 1, targets to which risk notifications are made can be minimized, so that it is possible to prevent disorder of a traffic stream due to excessive risk notifications, which results in improving convenience and smoothness as well as safety of traffic.

(3) The risk notification specifier 64 specifies a risk inducer that induces the contact risk among the plurality of prediction parties involved in the contact risk and sets higher priority and makes the risk notification earlier to the risk inducer than other prediction parties except the risk inducer. By this means, action that induces the contact risk by the risk inducer can be prevented, so that it is possible to prevent the contact risk from becoming apparent or occurring before the risk notifications are made to other prediction parties with lower priority. Thus, according to the traffic safety support system 1, targets to which risk notifications are made can be minimized, so that it is possible to prevent disorder of a traffic stream due to excessive risk notifications, which results in improving convenience and smoothness as well as safety of traffic.

(4) In a case where the predictor 62 predicts occurrence of a contact risk of parties that are a plurality of support targets in the monitoring area, the risk notification specifier 64 sets the notification mode for the prediction party determined so as to avoid occurrence of the contact risk among a plurality of prediction parties involved in the contact risk to the hinting notification mode until the contact risk becomes apparent. By this means, it is possible to prevent the predicted contact risk from becoming apparent. Further, the risk notification specifier 64 sets the notification mode for all the prediction parties involved in the contact risk to the analogue notification mode with a higher notification intensity than the hinting notification mode after the predicted contact risk becomes apparent. By this means, even in a case where the contact risk cannot be prevented from becoming apparent only with the risk notification in the hinting notification mode, by making the risk notifications to all the prediction parties in the analogue notification mode with a higher notification intensity than the hinting notification mode, it is possible to prevent occurrence of the contact risk. Thus, according to the traffic safety support system 1, it is possible to improve safety, convenience and smoothness of traffic.

(5) The risk notification specifier 64 acquires a contact prediction period that is a period until the contact risk will occur on the basis of the prediction result from the predictor 62, and in a case where the contact prediction period becomes less than the apparent threshold, determines that the contact risk becomes apparent. By determining that the contact risk becomes apparent at such a timing and making the risk notifications to all the prediction parties in the analogue notification mode, each prediction party can perform action for avoiding the contact risk with time to spare. Thus, according to the traffic safety support system 1, it is possible to improve safety, convenience and smoothness of traffic.

(6) In a case where the analogue notification mode is set as the notification mode, the notification devices 22, 32 and 42 set the notification intensity higher as the above-described contact prediction period becomes shorter. This allows a person who moves with the notification devices 22, 32 and 42 (for example, a pedestrian or a driver of the mobile body) to recognize existence of a contact risk that comes near and perform action for avoiding the contact risk. Thus, according to the traffic safety support system 1, it is possible to improve safety, convenience and smoothness of traffic.

(7) In a case where the hinting notification mode is set as the notification mode, the notification devices 22 and 32 emit sound effect with binaural sound having directivity toward a location where the contact risk is to occur or positions of prediction parties involved in the contact risk. This makes it possible to direct attention of a person who moves with the notification devices 22 and 32 (for example, a driver of the mobile body) to a potential risk in such a manner as not to annoy the driver.

(8) The notification devices 22 and 32 can execute soundness-promoting notification for bringing, into a sound state, driving capability of the driver of the mobile body that moves with the notification devices 22 and 32, and the coordination support device 6 includes the soundness-promoting notification specifier 63 configured to estimate soundness of the driver on the basis of the recognition information for each of setting targets except parties of the contact risk predicted by the predictor 62 among the plurality of support targets within the target traffic area 9 and further set ON/OFF of the soundness-promoting notification for each of the setting targets on the basis of these estimation results. This makes it possible to bring, into a sound state, the driver of the mobile body that moves within the target traffic area 9, so that it is possible to improve safety, convenience and smoothness of traffic in the target traffic area 9.

(9) The predictor 62 predicts future of the prediction targets by constructing a virtual space that simulates the monitoring area using a computer and performing simulation on the basis of the recognition information and the state information regarding the virtual space. This enables the predictor 62 to predict various risks that can occur in the prediction targets by reproducing the respective traffic participants in the monitoring traffic area and traffic environments around the respective traffic participants and monitoring an event that can occur in the monitoring traffic area from a higher perspective. Thus, according to the present invention, it is possible to further improve safety, convenience and smoothness of traffic.

(10) The behavior estimator 623 associates a behavior estimation input including at least the recognition information between the recognition information and the driving subject state information with at least one of a plurality of pattern behaviors of the driving subject determined in advance, and the simulator 626 predicts future of the prediction target by performing simulation on the basis of the pattern behavior associated by the behavior estimator 623 on the virtual space. In the traffic safety support system 1, by behaviors that can be performed by the driving subject of the mobile body in the future being determined in advance as pattern behaviors, the predictor 62 can promptly predict the future of the prediction target, which allows prompt notification of the coordination support information that is based on the prediction result from the predictor 62, so that it is possible secure a period for each traffic participant to perform action for avoiding a chain risk that can occur in the future. Thus, according to the traffic safety support system 1, it is possible to further improve safety, convenience and smoothness of traffic.

(11) The behavior estimator 623 includes the driving capability estimator 624 configured to estimate decrease of driving capability of the driving subject for each capability element on the basis of the behavior estimation input including at least the recognition information and the associator 625 configured to associate the capability element for which the driving capability is estimated to have decreased by the driving capability estimator 624 with at least one of the plurality of predetermined pattern behaviors. This allows the associator 625 to promptly determine a pattern behavior from the behavior estimation input, so that it is possible to further secure a period for each traffic participant to perform action for avoiding a chain risk that can occur in the future as described above. Thus, according to the traffic safety support system 1, it is possible to further improve safety, convenience and smoothness of traffic.

(12) In the traffic safety support system 1, the driving capability estimator 624 divides driving capability that the driving subject should have to appropriately drive the mobile body into at least four capability elements of cognitive capability, prediction capability, determination capability and operation capability and estimates decrease of the driving capability of the driving subject for each of the four capability elements. This allows the behavior estimator 623 to promptly determine an appropriate pattern behavior in accordance with decrease of each capability element, so that it is possible to further secure a period for each traffic participant to perform action for avoiding a chain risk that can occur in the future as described above. Thus, according to the traffic safety support system 1, it is possible to further improve safety, convenience and smoothness of traffic.

While one embodiment of the present invention has been described above, the present invention is not limited to this. Detailed configurations may be changed as appropriate within a scope of gist of the present invention.

What is claimed is:

1. A traffic safety support system comprising:

on-board devices that move with traffic participants as mobile bodies in a target traffic area; and a coordination support device capable of communicating with the on-board devices, the traffic safety support system being for supporting safe movement of support targets that are traffic participants having the on-board devices, wherein each of the on-board devices comprises a notification device configured to provide, to a driver of the mobile body that moves with the on-board device, a risk notification in a plurality of notification modes, the coordination support device comprises:

a recognizer configured to recognize recognition targets including the traffic participants in the target traffic area and traffic environments of the traffic participants, and acquire recognition information regarding the recognition targets;

a predictor configured to predict a contact risk with other traffic participant in future of prediction targets that are a plurality of traffic participants present in a monitoring area that is part of the target traffic area by performing simulation on a basis of the recognition information;

a risk notification specifier configured to set an operation manner of the risk notification for each of the support targets on a basis of the recognition information and a prediction result from the predictor; and a transmitter configured to transmit a setting result from the risk notification specifier to each of the support targets, and the notification device comprises:

a human machine interface configured to operate in a manner recognizable by the driver; and a control device configured to operate the human machine interface in a manner in accordance with the setting result transmitted from the coordination support device.

2. The traffic safety support system according to claim 1, wherein in a case where the predictor predicts occurrence of the contact risk of parties that are a plurality of support targets in the monitoring area, the risk notification specifier sets priority to a plurality of prediction parties involved in the contact risk on a basis of content of the contact risk and sets ON of the risk notification earlier to prediction parties for which the priority is set higher than prediction parties for which the priority is set lower.

3. The traffic safety support system according to claim 2, wherein the risk notification specifier specifies a risk inducer that induces the contact risk among the plurality of prediction parties involved in the contact risk and sets the priority higher to the risk inducer than to other prediction parties except the risk inducer.

4. The traffic safety support system according to claim 1, wherein in a case where the predictor predicts occurrence of the contact risk of parties that are a plurality of support targets in the monitoring area, the risk notification specifier sets a first mode as the notification mode for a prediction party determined so as to avoid occurrence of the contact risk from among the plurality of prediction parties involved in the contact risk until the contact risk becomes apparent, and sets a second mode with a higher notification intensity than the first mode as the notification mode for all the prediction parties involved in the contact risk after the contact risk becomes apparent.

5. The traffic safety support system according to claim 4, wherein the risk notification specifier acquires a contact prediction period that is a period until the contact risk will occur on a basis of the prediction result from the predictor, and in a case where the contact prediction period becomes less than an apparent threshold, determines that the contact risk becomes apparent.

6. The traffic safety support system according to claim 5, wherein in a case where the second mode is set as the notification mode, the notification device sets the notification intensity higher as the contact prediction period becomes shorter.

7. The traffic safety support system according to claim 5, wherein in a case where the first mode is set as the notification mode, the notification device emits sound having directivity toward a location where the contact risk is to occur or positions of the prediction parties involved in the contact risk.

8. The traffic safety support system according to claim 1, wherein the notification device is capable of executing soundness-promoting notification for bringing, into a sound state, driving capability of a driver of a mobile body that moves with the notification device, and the coordination support device further comprises a soundness-promoting notification specifier configured to estimate soundness of the driver for each of setting targets except parties of the contact risk predicted to occur by the predictor from among the plurality of support targets within the target traffic area on a basis of the recognition information and set ON/OFF of the soundness-promoting notification for each of the setting targets on a basis of the estimation result.

9. The traffic safety support system according to claim 1, wherein the coordination support device further comprises a driving subject information acquirer configured to acquire state information correlated with driving capability of a driving subject of a mobile body recognized as a traffic participant by the recognizer, and the predictor predicts the contact risk in future of the prediction targets by constructing a virtual space that simulates the monitoring area using a computer and performing simulation on a basis of the recognition information and the state information regarding the virtual space.

10. The traffic safety support system according to claim 9, wherein the predictor comprises:

a behavior estimator configured to associate a first input including at least the recognition information from the recognition information and the state information, with at least one of a plurality of pattern behaviors of the driving subject determined in advance; and a simulator configured to predict futures of the prediction targets by performing simulation based on the pattern behaviors associated by the behavior estimator on the virtual space.

11. The traffic safety support system according to claim 10, wherein the behavior estimator comprises:

a driving capability estimator configured to estimate decrease of the driving capability for each capability element on a basis of the first input; and an associator configured to associate the capability element for which the driving capability is estimated to have decreased by the driving capability estimator with at least one of a plurality of the pattern behaviors.

12. The traffic safety support system according to claim 11, wherein the driving capability is divided into at least four capability elements of cognitive capability, prediction capability, determination capability and operation capability of the driving subject.

* * * * *